(12) United States Patent
Bechtolsheim et al.

(10) Patent No.: US 6,405,128 B1
(45) Date of Patent: Jun. 11, 2002

(54) METHOD AND SYSTEM FOR PROVIDING AN ELECTRONIC HORIZON IN AN ADVANCED DRIVER ASSISTANCE SYSTEM ARCHITECTURE

(75) Inventors: Stephan Bechtolsheim, Buffalo Grove, IL (US); Larry Dunn, La Crosse, IN (US); Andreas Hecht, Frankfurt; Matthias Schmitt, Bad Camberg, both of (DE); Jerry Feigen; Michele Roser, both of Chicago, IL (US)

(73) Assignee: Navigation Technologies Corp., Chicago, IL (US)

( * ) Notice: Subject to any disclaimer, the term of this patent is extended or adjusted under 35 U.S.C. 154(b) by 0 days.

(21) Appl. No.: 09/467,608

(22) Filed: Dec. 20, 1999

(51) Int. Cl.[7] .............................................. G06F 165/00
(52) U.S. Cl. ....................... 701/208; 701/207; 701/117; 340/988; 340/990; 342/357.01
(58) Field of Search ................................. 701/208, 207, 701/117, 118, 119; 340/988, 990, 995; 342/357.01; 73/178 R

(56) References Cited

U.S. PATENT DOCUMENTS

| | | |
|---|---|---|
| 4,754,402 A | 6/1988 | Wand |
| 4,829,434 A | 5/1989 | Karmel et al. |
| 5,146,219 A | 9/1992 | Zechnall |
| 5,220,497 A | 6/1993 | Trovato et al. |
| 5,243,524 A | 9/1993 | Ishida et al. |
| 5,247,440 A | 9/1993 | Capurka et al. |
| 5,315,295 A | 5/1994 | Fujii |
| 5,390,118 A | 2/1995 | Margolis et al. |
| 5,408,411 A | 4/1995 | Nakamura et al. |
| 5,420,794 A | 5/1995 | James |
| 5,448,487 A | 9/1995 | Arai |
| 5,485,161 A | 1/1996 | Vaughn |
| 5,485,381 A | 1/1996 | Heintz et al. |
| 5,504,482 A | 4/1996 | Schreder |
| 5,539,397 A | 7/1996 | Asanuma et al. |
| 5,546,311 A | 8/1996 | Sekine |

(List continued on next page.)

FOREIGN PATENT DOCUMENTS

| | | |
|---|---|---|
| EP | 0838771 | 4/1988 |
| EP | 0 745 788 A1 | 4/1996 |
| EP | 0 795 700 A2 | 9/1997 |
| EP | 0936441 | 8/1999 |
| EP | 1043567 | 10/2000 |

OTHER PUBLICATIONS

Casparsson et al. "Volcano a revolution in on–board communications," (1998) http://www.tech2.volvo.se/reportage/9811volcano/main.htm.

Melin, "Volvo S80 Electrical system of the future," (1998) http://www.tech2.volvo.se/reportage/9811electrical/main.htm.

Primary Examiner—William A. Cuchlinski, Jr.
Assistant Examiner—Olga Hernandez
(74) Attorney, Agent, or Firm—Frank J. Kozak; Jon D. Shutter

(57) ABSTRACT

A method and system for use by driver assistance systems installed in a motor vehicle to continuously provide such systems with updated data about paths along roads onto which the motor vehicle can travel from a current position of the motor vehicle as the motor vehicle travels along said roads. The method includes accessing a database that contains data that represents segments of roads and intersections of a road network located in a geographic region in which the motor vehicle is traveling and determining one or more paths along roads onto which the motor vehicle can travel from a current position of the motor vehicle. Each path is extended out to a threshold. Data representing each of the paths is provided in an organized data structure for use by the driver assistance systems.

80 Claims, 18 Drawing Sheets

U.S. PATENT DOCUMENTS

| | | |
|---|---|---|
| 5,570,087 A | 10/1996 | Lemelson |
| 5,572,449 A | 11/1996 | Tang et al. |
| 5,661,650 A | 8/1997 | Sekine et al. ................. 701/82 |
| 5,684,696 A * | 11/1997 | Rao et al. ..................... 701/25 |
| 5,703,780 A | 12/1997 | Takanabe et al. ........... 701/209 |
| 5,751,228 A | 5/1998 | Kamiya et al. ............. 340/988 |
| 5,839,087 A * | 11/1998 | Sato .......................... 701/207 |
| 5,893,045 A | 4/1999 | Kusama et al. ............. 701/211 |
| 5,893,894 A | 4/1999 | Moroto et al. ................ 701/53 |
| 5,899,955 A * | 5/1999 | Yagyu et al. ................ 701/209 |
| 5,911,773 A | 6/1999 | Mutsaga et al. ............ 701/200 |
| 5,919,245 A * | 7/1999 | Nomura ..................... 701/207 |
| 5,919,246 A | 7/1999 | Waizmann et al. ......... 701/209 |
| 5,928,305 A * | 7/1999 | Nomura ..................... 701/207 |
| 5,978,724 A | 11/1999 | Sekine ......................... 701/70 |
| 6,009,374 A | 12/1999 | Urahashi .................... 701/209 |
| 6,067,501 A * | 5/2000 | Vieweg ...................... 701/209 |
| 6,076,041 A * | 6/2000 | Watanabe ................... 701/211 |
| 6,161,071 A | 12/2000 | Shuman et al. |
| 6,175,805 B1 * | 1/2001 | Abe ........................... 701/209 |
| 6,184,823 B1 * | 2/2001 | Smith et al. ........... 342/357.13 |
| 6,192,312 B1 * | 2/2001 | Hummelsheim ............ 701/118 |
| 6,212,472 B1 | 4/2001 | Nonaka et al. |
| 6,223,124 B1 | 4/2001 | Matsuno et al. |

* cited by examiner

FIG. 3A

| | NAME | DESCRIPTION | SOURCE |
|---|---|---|---|
| 1 | LEVEL OF DIGITIZATION | SUPPLEMENTARY130(2), CONNECTING SEGMENT, DETAILED CITY COVERAGE, ROAD NETWORK COVERAGE, INTERTOWN | PRIMARY 130(1) |
| 2 | STREET NAME | PREFERRED STREET NAME OF SEGMENT. MAY BE EMPTY IF SEGMENT HAS NO NAME. | PRIMARY 130(1) |
| 3 | COUNTRY CODE | COUNTRY CODE (44=UK, 49=GERMANY,...) | PRIMARY 130(1) |
| 4 | LONGITUDE | LONGITUDE, ACCURACY OF +/-1M FOR SUPPLEMENTARY130(2) DATA | PRIMARY 130(1) OR SUPPLEMENTARY130(2) |
| 5 | LATITUDE | LATITUDE, ACCURACY OF +/-1M FOR SUPPLEMENTARY130(2) DATA | PRIMARY 130(1) OR SUPPLEMENTARY130(2) |
| 6 | ALTITUDE | ALTITUDE ABOVE SEA LEVEL. COLLECTED TO DGPS ACCURACY. | SUPPLEMENTARY130(2) |
| 7 | LOWER AND UPPER BOUNDS FOR NUMBER OF LANES | LOWER AND UPPER BOUNDS FOR NUMBER OF LANES BEFORE AND AFTER CURRENT POINT (TO APPROXIMATE MERGING LANES). | PRIMARY 130(1) OR SUPPLEMENTARY130(2) |
| 8 | REST AREA | CURRENT POINT WITHIN OR OUTSIDE A REST AREA, OR AT CURRENT POINT REST AREA STARTS AND ENDS? | SUPPLEMENTARY130(2) |
| 9 | PARKING AREA | CURRENT POINT WITHIN OR OUTSIDE A PARKING AREA OR AT CURRENT POINT PARKING AREA STARTS OR ENDS? | SUPPLEMENTARY130(2) |
| 10 | EMERGENCY LANE | EMERGENCY LANE AT THE CURRENT POINT? | SUPPLEMENTARY130(2) |
| | PHYSICAL LANE DIVIDER | PHYSICAL LANE DIVIDER ON THE ROAD | PRIMARY 130(1) OR SUPPLEMENTARY130(2) |

FIG. 3B

| | NAME | DESCRIPTION | SOURCE |
|---|---|---|---|
| 11 | FOREST | TREES OR FOREST WITHIN A SPECIFIED DISTANCE OF THE ROAD'S BOUNDARIES? | SUPPLEMENTARY130(2) |
| 12 | MAXIMUM ALLOWABLE SPEED RANGE | THE MAXIMUM SPEED IS WITHIN THE RANGE [I..J]. UNIT IS KM/H. I=J FOR SUPPLEMENTARY130(2) DATA. SPEED SIGNS ARE NOT DIRECTLY REPRESENTED. | PRIMARY 130(1) OR SUPPLEMENTARY130(2) |
| 13 | ACCELERATION LANE | CURRENT POINT ON OR NEXT TO AN ACCELERATION LANE? | SUPPLEMENTARY130(2) |
| 14 | TUNNEL/ UNDERPASS | CURRENT POINT INSIDE A TUNNEL? THERE IS NO MINIMUM TUNNEL LENGTH. ALLOWS FOR TUNNEL TO START AND END INDEPENDENTLY FOR BOTH SEGMENT SIDES. | PRIMARY 130(1) OR SUPPLEMENTARY130(2) |
| 15 | BRIDGE/ OVERPASS | CURRENT POINT ON A BRIDGE? THERE IS NO MINIMUM BRIDGE LENGTH. ALLOWS FOR BRIDGE TO START AND END INDEPENDENTLY FOR BOTH SEGMENT SIDES. | PRIMARY 130(1) OR SUPPLEMENTARY130(2) |
| 16 | LEVEL CROSSING | CURRENT POINT IN A LEVEL CROSSING REGION? | SUPPLEMENTARY130(2) |
| 17 | PASSING ALLOWED | POINT IN PASSING ZONE, OUTSIDE OF PASSING ZONE, BEGINNING OR END OF PASSING ZONE? | SUPPLEMENTARY130(2) |
| 18 | TRAFFIC LIGHT | TRAFFIC LIGHT AT THE CURRENT POINT? | SUPPLEMENTARY130(2) |
| 19 | YIELD SIGN | YIELD SIGN AT THE CURRENT POINT? | SUPPLEMENTARY130(2) |
| 20 | ENTER CITY SIGN | "ENTERING CITY" SIGN AT THE CURRENT POINT? | SUPPLEMENTARY130(2) |
| 21 | EXIT CITY SIGN | "EXITING CITY" SIGN AT THE CURRENT POINT? | SUPPLEMENTARY130(2) |

ELECTRONIC HORIZON WITH PATH DESCRIPTORS

METHOD AND SYSTEM FOR PROVIDING AN ELECTRONIC HORIZON IN AN ADVANCED DRIVER ASSISTANCE SYSTEM ARCHITECTURE

REFERENCE TO RELATED APPLICATION

The present application is related to the copending application entitled "MAP DATA ARCHITECTURE PLATFORM FOR ADVANCED DRIVER ASSISTANCE SYSTEMS" filed on even date herewith U.S. appli. Ser. No. 09/466,517, the entire disclosure of which is incorporated by reference herein.

BACKGROUND OF THE INVENTION

The present invention relates to a map data architecture platform that can be used in on-road vehicles, such as automobiles, trucks, buses, and so on, and in particular the present invention relates to a map data architecture platform that supports advanced driver assistance systems provided in on-road vehicles.

Advanced driver assistance systems ("ADAS") have been developed with the intent of improving the safety, comfort, efficiency, and overall satisfaction of driving. Examples of advanced driver assistance systems include adaptive headlight aiming, adaptive cruise control, and adaptive shift control. Adaptive headlight aiming adjusts the vehicle's headlights, i.e., width, rotational angle, elevation angle, and brightness, based on the curvature of the road ahead of the vehicle, tilt, elevation change, and other factors. Adaptive cruise control maintains and/or resumes a set speed or safe following distance from other vehicles at slower than the set speed based on data about vehicle speed, nearby vehicles and other obstructions, type of road traveled (motorway vs. local road), road curvature, tilt, elevation, and other factors. Adaptive shift control adjusts the gearing and shifting of automatic transmissions based on sensor data about vehicle speed, engine speed, road curvature, tilt, elevation, and other factors. There are other advanced driver assistance systems in addition to these.

These advanced driver assistance systems use a variety of sensor mechanisms in the vehicle to determine the current state of the vehicle and the current state of the roadway in front of the vehicle. These sensor mechanisms may include radar and vision-oriented sensors, such as cameras. Although radar and vision-oriented sensors are important components of advanced driver assistance systems, these components have limitations. The range and/or accuracy of radar or vision-oriented sensors can be affected by certain environmental conditions, such as fog, heavy rain or snow, or snow-covered roads. Moreover, radar and vision-oriented systems do not reliably detect certain useful road attributes, such as speed limits, traffic signs, bridge crossings, etc. Further, radar and vision-oriented sensors cannot "see" around corners or other obstructions and therefore may be limited under such circumstances.

One way to address the limitations of radar and vision-oriented systems is to use digital map data as an additional component in advanced driver assistance systems. Digital map data can be used in advanced driver assistance systems to provide information about the road ahead. Digital map data are not affected by environmental conditions, such as fog, rain or snow. In addition, digital map data can provide useful information that cannot reliably be provided by vision-oriented systems, such as speed limits, traffic and lane restrictions, etc. Further, digital map data can be used to determine the road ahead of the vehicle even around corners or beyond obstructions. Accordingly, digital map data can be a useful addition in advanced driver assistance systems.

Although digital map data can be used as an additional component in advanced driver assistance systems, issues remain to be addressed before digital map data can be widely used for such purposes. For example, there is a need to efficiently handle the relatively large amount of digital map data required for advanced driver assistance systems. In addition, different advanced driver assistance systems require different types and quantities of digital map data and therefore there is a need to provide those digital map data needed by the various advanced driver assistance systems.

SUMMARY OF THE INVENTION

To address these and other objectives, the present invention comprises a method and system for use by driver assistance systems installed in a motor vehicle to continuously provide such systems with updated data about paths along roads onto which the motor vehicle can travel from a current position of the motor vehicle as the motor vehicle travels along said roads. The method includes accessing a database that contains data that represents segments of roads and intersections of a road network located in a geographic region in which the motor vehicle is traveling and determining one or more paths along roads onto which the motor vehicle can travel from a current position of the motor vehicle. Each path is extended out to a threshold. Data representing these paths are provided in an organized data structure for use by the driver assistance systems. The data representing the paths include data about road geometry, road attributes, and objects along each path.

BRIEF DESCRIPTION OF THE DRAWINGS

FIGS. 3A and 3B show the types of data contained in the map database component of the advanced driver assistance systems map data architecture.

DETAILED DESCRIPTION OF THE DESCRIPTION OF THE PRESENTLY PREFERRED EMBODIMENTS

I. TERMINOLOGY

Figure 1:
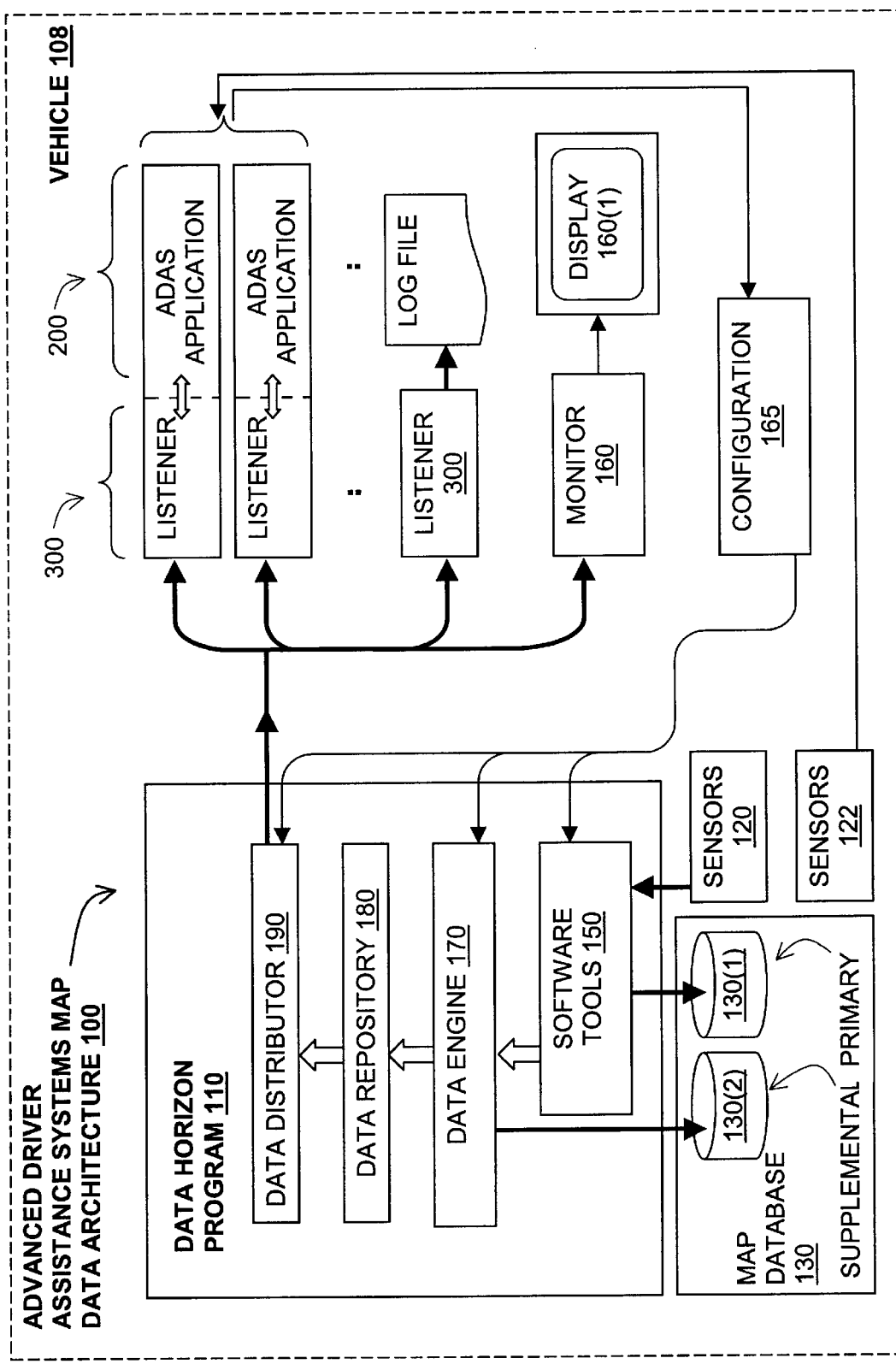
FIG. 1 is a functional block diagram of the advanced driver assistance systems map data architecture 100.

The following terminology and concepts are used in this specification. (The terminology and definitions provided herein are not intended to be limiting. Other terminology and definitions may be used to express similar or identical concepts.)

(1) Segments and nodes. A "segment" (also referred to as a "road segment") is a length of a road. Each segment has two end points. A "node" is one of the end points of a segment. A segment has a left node and a right node. The left node is the node with the smaller longitude value. If the longitude values of both nodes are the same, the left node is the node with the smaller latitude. According to one embodiment, segments and nodes are represented by data in a map database used by the driver assistance system map data architecture.

(2) Shape points. "Shape points" are intermediate points on a segment between its end points. Shape points are used for several purposes. Shape points may be used to model the curvature of a road segment. Shape points may also be used to model overpasses and underpasses. For example, when one road segment crosses another road segment at a different elevation (e.g., an overpass or underpass), a shape point is associated with each road segment at the location of the crossing and an attribute of each shape point indicates a relative altitude or an absolute altitude of the associated road segment at that location. According to one embodiment, shape points are represented in the map database used by the driver assistance system map data architecture.

(3) Travel direction. The "travel direction" on a segment (the permissible direction of a vehicle travel on a segment) is expressed in terms of "travel from the left node to the right node" or "from the right to the left node."

(4) Entrance node and exit node. The node encountered first in the context of travelling on a segment is referred to as the "entrance node," the other node is referred to as the "exit node."

(5) Point. A "point" refers to a node or a shape point of a segment. A point has a geographic location (e.g., latitude, longitude, and altitude) associated with it.

(6) Segment location. A "segment location" is any place on a segment. Whereas the term "point" only refers to nodes and shape points of segments, a segment location includes all locations on a segment including the nodes, all shape points, and all logical points (i.e., locations) between the nodes and shape points.

(7) Segment bearings and headings. The "bearing" of a segment at a node refers to the direction of the segment at that node. The direction is measured from the node towards the inside of the segment. For instance, the bearing at the left node is the heading of a vehicle at the left node as the vehicle travels from the left to the right node. The heading of a segment at the left or right node is computed from the bearing value at the appropriate node plus 180 degrees.

(8) Curvature. "Curvature" describes how a portion of a segment curves at a point or a segment location. There are different ways of calculating and representing curvature. One way to represent the curvature at a point of a segment is by the radius of a circle that corresponds to the curve of the segment at that point. According to one embodiment, curvature is represented by data in a map database used by the driver assistance system map data architecture. According to another embodiment, curvature may be calculated using data indicating the coordinates of successive points along a road segment.

(9) Path. A "path" is a sequence of one or more road segments (or portions thereof) upon which a vehicle might travel from a current location.

(10) Road objects. A "road object" refers to an object located on or along a road, such as a sign or a crosswalk.

(11) Road geometry. "Road geometry" refers to the shape and curvature of a road. Road shape is defined by the geographic coordinates of points along a road segment. ("Curvature" is described separately below.)

II. ADVANCED DRIVER ASSISTANCE SYSTEMS MAP DATA ARCHITECTURE

A. Overview

FIG. 1 is a functional block diagram of the advanced driver assistance systems map data architecture 100. The advanced driver assistance systems map data architecture 100 is a combination of software and hardware components installed in a motor vehicle 108. The advanced driver assistance systems map data architecture 100 provides access to map-related data for use by advanced driver system applications 200. The advanced driver assistance systems map data architecture 100 includes the following components.

(1). Sensors 120.—The sensors 120 provide outputs that are used by programming in the advanced driver assistance systems map data architecture 100 to determine the position of the vehicle 108 on the road network and to provide other information, such as speed and heading of the vehicle. (In addition to these sensors 120, the advanced driver system applications 200 may use the outputs from other types of sensors 122. These other types of sensors 122 may include radar or vision system-types of sensors.)

(2). A map database 130.—The map database 130 includes information about geographic features, such as roads and points of interest, in the geographic area in which the vehicle 108 in which the advanced driver assistance systems map data architecture 100 is installed is traveling.

(3). Data horizon program 110.—The driver assistance systems map data architecture 100 includes a data horizon program 110. The data horizon program 110 includes the programming that uses the map database 130 and inputs from the sensors 120 to provide map-related data to the advanced driver assistance systems 200.

(4). Software tool components 150.—In this embodiment, the software tool components 150 are a part of the data horizon program 110. The software tool components 150 include programming for accessing the map database 130 and software tool programs for performing certain required functions with the map data obtained from the map database 130.

(5). A monitoring program 160.—The monitoring program 160 is a software component of the advanced driver assistance systems map data architecture 100 that provides for monitoring execution of the data horizon program 110.

(6). A configuration program 165.—The configuration program 165 is a software component of the advanced driver assistance systems map data architecture 100 that provides for configuration of the data horizon program 110.

(7). A data engine 170.—The data engine 170 is a component of the data horizon program 110. The data engine 170 determines and obtains from the map database 130 the relevant data about the road lying ahead of (or behind) the vehicle.

(8). A data repository 180.—The data repository 180 is a component of the data horizon program 110. The data repository 180 contains the latest relevant data about the road lying ahead of (or behind) the vehicle as determined by the data engine 170.

(9). A data distributor 190.—The data distributor 190 is a component of the data horizon program 110. The data distributor 190 provides notification that new data about the road lying ahead of (or behind) the vehicle has been stored in the data repository 180.

(10). One or more advanced driver assistance applications 200.—These applications 200 use the map-related data provided by the data horizon program 110. These applications 200 may include adaptive headlight aiming, adaptive cruise control, obstruction detection, obstruction avoidance, collision avoidance, adaptive shift control and others.

(11). One or more data listeners 300.—A data listener 300 is a software component used for obtaining data from the data horizon program 110. A data listener 300 receives the notifications from the data distributor 190 and obtains data from the data repository 180. A data listener 300 may be implemented as part of each driver assistance application 200 or a data listener may be implemented as a standalone software component.

Each of the above components of the advanced driver assistance system map data architecture 100 is described in more detail below.

B. The positioning sensors 120

Figure 2:
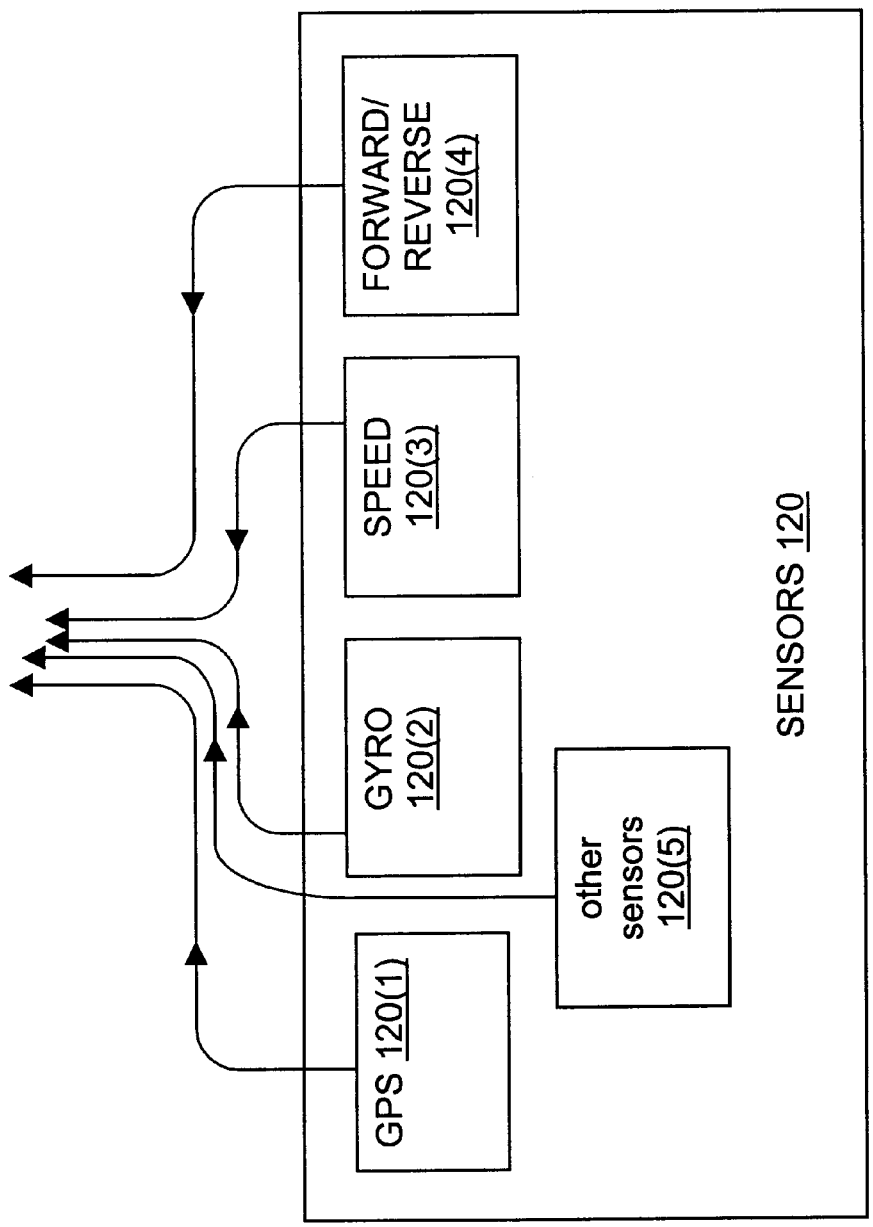
FIG. 2 is a block diagram of the sensor component of the advanced driver assistance systems map data architecture 100 shown in FIG. 1.

Referring to FIGS. 1 and 2, the data horizon program 110 receives the outputs from the positioning sensors 120. According to one embodiment, these sensors 120 include a GPS system 120(1), a gyroscope 120(2), a vehicle speed sensor 120(3) and a vehicle forward/reverse sensor 120(4). Other types of sensors 120(5) may also be included. For example, the sensors may include inertial navigation sensors.

In one embodiment, the GPS system 120(1) is a system manufactured by Trimble and the gyroscope 120(2) is a unit manufactured by Murata. Equipment from other manufacturers may also be used. Data indicating the vehicle speed and/or the vehicle forward/reverse direction may be obtained from sensors or components provided for other purposes elsewhere in the vehicle 108. In one embodiment, the gyroscope and speed signals are collected every 100 milliseconds. The GPS and the vehicle forward/reverse direction sensor are provided at a frequency of once per second. In other embodiments, the sensor outputs may be provided at different frequencies.

C. The map database(s) 130.

(1). Map database organization.

Referring again to FIG. 1, the map database 130 includes information about roads, intersections, points of interest, and possibly other geographic features in the geographic region in which the vehicle 108 in which the advanced driver assistance systems map data architecture 100 is installed is traveling. In the embodiment shown in FIG. 1, the map database 130 is formed of one or more component databases. Specifically, the map database 130 includes a primary database 130(1) and a supplementary database 130(2).

The primary map database 130(1) may be similar or identical to a database used in in-vehicle navigation systems. According to this embodiment, the primary map database 130(1) supports navigation-related functions, including vehicle positioning, route calculation, route guidance, and map display. The primary database 130(1) also provides support for a portion of the advanced driver assistance system functions. In this embodiment, the primary database 130(1) also provides a portion of the data readings provided to the driver assistance applications 200, as described below.

In one embodiment, the primary map database 130(1) is a database in the SDAL™ physical storage format developed and published by Navigation Technologies Corporation of Rosemont, Illinois. In one embodiment, the primary database 130(1) is in version 1.7 of the SDAL™ physical storage format. A suitable embodiment of a primary map database is described in U.S. Pat. No. 5,968,109, the entire disclosure of which is incorporated by reference herein. (The inventive subject matter disclosed herein is not limited to any specific database format.)

The supplementary database 130(2) also contains data about roads and intersections in the geographic region. However, the supplementary database 130(2) includes data that is not necessarily provided in the primary map database 130(1). The supplementary map database 130(2) may include higher quality (i.e., more accurate) data than the data which is contained is in the primary database 130(1). For example, with respect to road geometry, the data in the supplementary database 130(2) may be more accurate with respect to longitude, latitude, and/or altitude. Also, the starting and stopping locations of tunnels may be more accurately specified in the supplementary database 130(2) than in the primary database 130(1). Further, the data in the supplementary database 130(2) may be more accurate with respect to derived information, such as curvature.

The supplementary database 130(2) may also include more kinds of data (e.g., more kinds of attributes) than the data which is contained in the primary database 130(1). For example, the supplementary database 130(2) may include data about road objects, such as signs and crosswalks including their positions along the road segment, sign object type and sign text. The supplementary database 130(2) may also include data indicating whether a road is tree-lined, etc.

According to one embodiment, both the primary database 130(1) and the supplementary database 130(2) include data representing all the roads and intersections in the covered region. According to this alternative, the data in the supplementary database 130(2) supplements the representation of each road segment which is also represented in the primary database 130(1).

According to an alternative embodiment, the supplementary database 130(2) represents fewer roads than the primary database 130(1). In this alternative embodiment, whereas the primary database 130(1) may include data representing all the roads and intersections in the covered region, the supplementary database 130(2) includes data representing only a portion of all the roads in the covered region. For example, the supplementary database 130(2) may include only the roads with the highest traffic volumes (e.g., expressways, major thoroughfares). The road segments represented by the supplementary database 130(2) may also be represented by data in the primary database 130(1).

According to yet another alternative embodiment, instead of using two separate databases, a single database is used by the driver assistance systems map data architecture 100. In this single database embodiment, the lower accuracy data contained in the primary database 130(1) is combined with the higher accuracy data contained in the supplementary database 130(2). In the single database embodiment, all the roads may be represented by data having the high accuracy standard of the supplementary database. Alternatively, in the single database embodiment, only some of the represented roads are represented by higher accuracy data and the remainder of the roads are represented by a lower accuracy data.

In the single database embodiment that contains both higher accuracy data and lower accuracy data, a means is provided to indicate whether a represented road segment is represented by higher accuracy data or by lower accuracy data. A data attribute (e.g., a high-accuracy-data bit) may be associated with each data entity representing a road segment to indicate whether the data representing the segments conforms to a specified high accuracy standard. In further alternatives, roads may be represented by data of different accuracy levels. Each of these different accuracy levels may be indicated by a accuracy level designation (e.g., 0–7).

(2). Integrating data of different accuracy levels

As stated above, in some embodiments of the map database 130 some roads are represented by data having an accuracy level high enough for use by advanced driver assistance system applications and other roads are represented by data having an accuracy level that is not high enough to be used by advanced driver assistance system applications. In these embodiments, a means is provided by which higher accuracy data is integrated with lower (or unknown) accuracy data. To provide this integration, data are included in the map database 130 to represent transition segments. A "transition segment" is a segment which is connected at one end to another segment represented by data having a high accuracy level and at its other end to another segment represented by data of a lower (or unknown) accuracy level. In a transition segment, the coordinates of the node connected to the segment represented by data having a high accuracy level are stored at the higher accuracy level. However, the coordinates of the node connected to the segment represented by data of a lower (or unknown) accuracy level are stored to the lower accuracy level. Therefore, according to this embodiment, there are three classes of segments: (1) segments represented by high accuracy data, (2) segments represented by lower (or unknown) accuracy data, and (3) transition segments connecting (1) and (2).

(3). Kinds of data attributes included in the map database

As stated above, the map database 130 includes information about roads and intersections. According to one embodiment, the map database 130 represents each road segment with a separate segment data entity. Each node at the end point of a road segment is represented by a separate node data entity. The map database 130 includes (data) attributes associated with the segment data entities and (data) attributes associated with the node data entities. Node attributes relate to a property or characteristic of the end nodes of a segment. Segment attributes relate to a property or characteristic associated with the segment as a whole or with a specific point (location) along the segment.

Examples of node attributes include the following:

(1). The number of segments extending from the current node. This count includes the current segment (i.e., the entrance segment). All segments are counted, whether accessible or not.

(2). The number of possible turns the vehicle can perform at the specified node. (i-turns are not included in this count.)

In addition to the above, various other attributes may be associated with nodes, including geographic coordinates, altitude, name, identification (e.g., by ID number) of road segments connected thereto, turn restrictions, etc.

As stated above, segment attributes can relate to a property or characteristic associated with a specific point (location) along the segment. These attributes of a segment are referred to as "point dependent attributes." This type of segment attribute describes a property related to a "point" on a segment (where a "point" refers to either one of the two end nodes of a segment or a shape point on the segment).

A point dependent attribute is used to represent a property of the road segment at the point, as grade, banking, etc.

In a present embodiment, certain point dependent attributes are associated with a travel direction along a segment. A "stop sign" attribute is an example of a point dependent attribute associated with a travel direction. A "stop sign" attribute indicates the presence of a stop sign at a point along a segment associated with a specific direction of travel (e.g., there may not be a stop sign when traveling in the opposite direction along the segment).

A "stop sign" attribute is also an example of a Boolean attribute. A Boolean attribute is a point dependent attribute that is either true or false at the specific point. A "stop sign" is modeled using a Boolean attribute because a stop sign is either present or not present at a specific point.

Another kind of point dependent attribute is a Boolean transition attribute. Boolean transition attributes describe properties or characteristics that apply to every location on a segment, not just to the points of a segment. A Boolean transition attribute is an attribute that changes values only at segment points, if at all. (The terms "before" and "after" refer to a vehicle approaching a point and driving beyond that point.) For example, for any location on a segment (not just any point) given a travel direction, vehicle "passing" is either allowed or not allowed. In order to model whether vehicle "passing" is allowed, an assumption is made that any related sign (such as "start no pass zone" and "end no pass zone") is located at a point of a segment. If this is the case, one of the following apply for any point of the segment.

True->true transition: passing is allowed before the point and after the point.

True->false transition: passing is allowed before the point but not after the point.

False->true transition: passing is not allowed before the point but is allowed after the point.

False->false transition: passing is not allowed before the point and is also not allowed after the point.

Another kind of point dependent attribute is an integer range transition attribute. An integer range transition attributes is an attribute representing integer ranges or integer intervals. An integer range attribute has a fixed value between any two consecutive points of a segment but may change its value at any point to a different interval. A value is defined before a point and at the point. An example of when an integer range transition attribute is used is for "maximum speed information," An integer range value such as {20 . . . 29} means that the maximum legal speed is between 20 and 29 km/h. An integer range value such as {20 . . . 20} means that the maximum legal speed is exactly 20 km/h. Values may also be specified for different times of day.

Some segment attributes may be identical for every point of the segment (e.g., a road name). Such attributes may be specified once for the entire segment.

Point dependent attribute information may be stored in SDAL™ format or in other database tables.

FIGS. 3A and 3B show some of the types of data included in the map database 130. The table column labeled "Source" in FIGS. 3A and 3B indicates whether the data element is found in the primary database 130(1), the supplementary database 130(2), or both.

(4). Curvature

According to one embodiment, included among the segment attributes is an attribute representing curvature. "Curvature" is a property of a point along a length of a segment. Curvature describes how a portion of a segment curves at that point. In a present embodiment, curvature is defined for the points of a segment (i.e., shape points, nodes). Curvature is described by two components: a curvature direction (left curve, right curve and straight) and a curvature radius. No curvature radius is defined for the case of a straight or nearly straight line. (A segment for which the curvature radius exceeds a configurable threshold value may be considered a straight line.)

Curvature data may be obtained in several different ways. One way to obtain curvature data is to measure it directly using sensor equipment (e.g., an accelerometer) and storing the measurement as a data attribute associated with a point in the map database 130. Another way to obtain curvature data is to compute the curvature using position data. For a sequence of three points, the curvature at the middle point can be determined by computing the radius of a circle whose circumference includes the positions of the three points. Curvature data obtained by calculation using position data may be stored in the map database 130. Alternatively, curvature may be computed as needed by a software function in the vehicle. Such a software function may be included among the advanced driver assistance system applications 200 using position data associated with points stored in the map database 130. Alternatively, a software function that computes curvature from position data may be included in the data horizon program 110.

D. Software tool components 150

Figure 4:
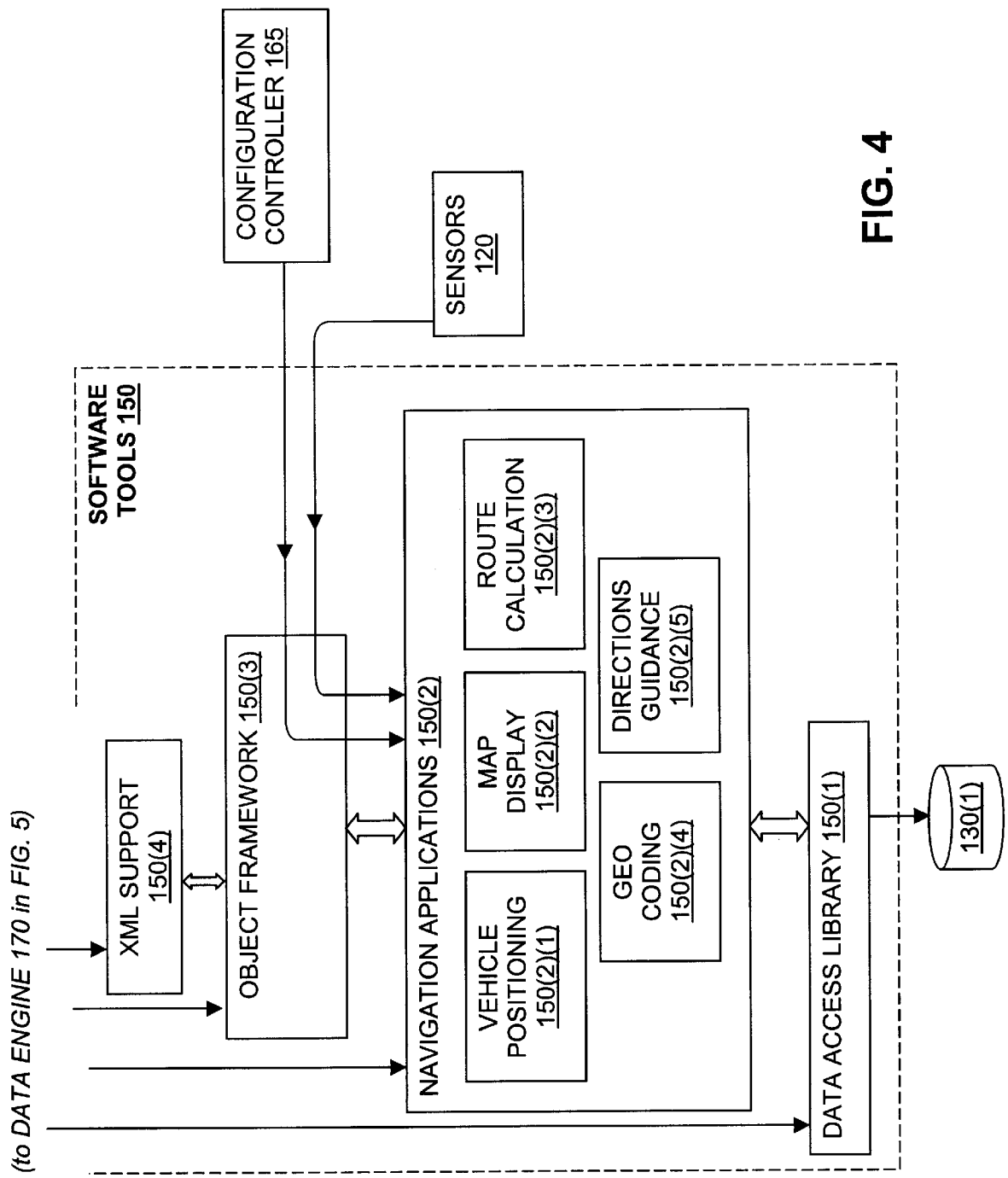
FIG. 4 is a block diagram of the components of the software tools shown in FIG. 1.

The software tool components 150 provide the foundation upon which the data horizon program 110 is built. In the embodiment shown in FIGS. 1 and 4, the software tool components 150 include a data access layer 150(1), navigation applications 150(2), and an object framework 150(3).

The data access layer 150(1) provides for accessing the map database 130. In one embodiment, the data access layer 150(1) is the SDAL™ library available from Navigation Technologies Corporation of Rosemont, Ill. The data access layer 150(1) provides a set of application programming interfaces (API) in the form of software libraries for efficient access to the map attributes in the primary database 130(1). An embodiment of the data access layer 150(1) is described in copending application Ser. No. 08/740,298, filed Oct. 25, 1996, the entire disclosure of which is incorporated by reference herein.

The navigation applications 150(2) provide functions similar to those used in in-vehicle navigation systems. According to one embodiment, the navigation applications 150(2) are provided in the form of API software library routines. These API software library routines provide for operations frequently used in map-data-related applications. Included among the navigation applications 150(2) are vehicle positioning 150(2)(1), map display 150(2)(2), route calculation 150(2)(3), geo-coding 150(2)(4), and direction guidance 150(2)(5). In one embodiment, the navigation applications 150(2) are NavTools™ software available from Navigation Technologies Corporation of Rosemont, Ill. Embodiments of navigation applications for vehicle positioning, map display, route calculation and direction guidance are described in copending applications Ser. Nos. 09/276,377, 09/047,141, 09/047,698, 08/893,201, and 09/196,279, the entire disclosures of which are incorporated by reference herein.

The object framework 150(3) provides an object-oriented wrapper around the data access layer 150(1) and the navigation applications 150(2). The object framework 150(3) simplifies use of the data access layer 150(1) and the navigation applications 150(2). The object framework 150(3) may also facilitate development of applications on certain platforms (e.g., a Microsoft Windows/NT environment).

XML in the advanced driver assistance system data architecture

In one embodiment, the advanced driver assistance system map data architecture 100 uses XML (extensible Markup Language). For example, log file and other information may be generated in XML. Similarly, some of the information read in by the advanced driver assistance system map data architecture 100 may be encoded in XML. An advantage of having one file format for multiple purposes simplifies the manipulation and further processing of input and output information. Use of XML is advantageous in a development and testing environment.

In one embodiment, Microsoft's Internet Explorer Version 5.0 (IE5) or another program that supports XML as a native file format can be used. IE5 also processes XSL (XML-related style files). This allows XML files to be presented in different ways.

E. The data engine 170

(1). Overview

Figure 5:
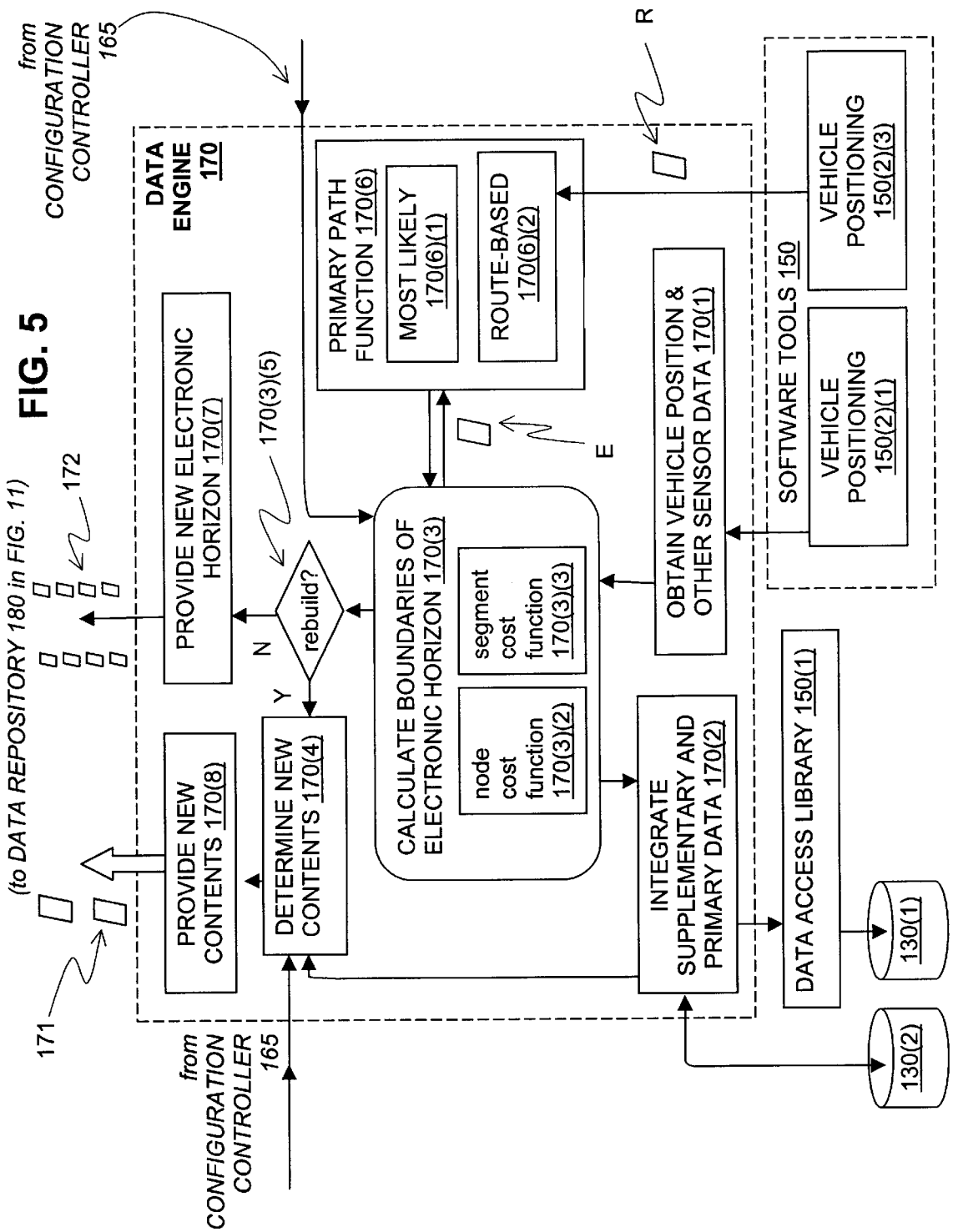
FIG. 5 is a block diagram of the components of the data engine shown in FIG. 1.

Referring to FIGS. 1 and 5, the data horizon program 110 includes a data engine 170. The data engine 170 is that component of the data horizon program 110 that calculates an electronic horizon (described in more detail below). The data engine 170 provides an output that includes the data representing the electronic horizon in an organized format. The data engine 170 provides this output on a cyclic basis.

(2). Inputs to the data engine

In performing its functions, the data engine 170 uses data indicating the vehicle position (including direction and speed) as an input. Referring to FIG. 5, the data engine 170 includes a data receiving process 170(1) that performs this function. The data receiving process 170(1) receives data indicating the vehicle position from the vehicle positioning tool 150(2)(1). The data indicating the vehicle position includes an identification of the road segment upon which the vehicle is located, the position along the identified road segment at which the vehicle is located, and the direction the vehicle is heading along the road segment. The road segment upon which the vehicle is located is determined by the vehicle positioning tool 150(2)(1) using data from the map database 130.

The position along the identified road segment may be provided in various different ways. For example, the vehicle position along the road segment may be provided as a distance from an end (e.g., n meters from the left endpoint). In another alternative, if the road segment includes shape points located between its end points, the position of the vehicle along the road segment may be indicated by that shape point to which the vehicle is closest. Alternatively, the vehicle position along the identified road segment may be identified as that shape point which is immediately ahead of the vehicle position. In another alternative, the vehicle position along a road segment may be provided in incremental portions of the road segment length (e.g., $n/256^{th}$ along a road segment).

The data indicating the vehicle direction may be provided to the data receiving component 170(1) of the data engine 170 by the vehicle positioning tool 150(2)(1) by indicating which node of the segment the vehicle is heading toward. The data receiving component 170(1) of the data engine 170 also obtains the speed of the vehicle (e.g., from the sensors 120).

The vehicle positioning tool 150(2)(1) may provide a new output indicating a new vehicle position at regular intervals.

These intervals may be once per second, 10 times per second, 100 times per second, once every 2 seconds, or any other period. The intervals may also be irregular intervals or may be intervals based on some other factor, such as distance, or a combination of factors, such as time and distance. According to a present embodiment, the data receiving component 170(1) receives each output of the vehicle positioning tool 150(2)(1) indicating a new vehicle position.

The vehicle positioning tool 150(2)(1) may determine that the vehicle 108 is off-road. The vehicle 108 is off-road if the vehicle positioning tool 150(2)(1) cannot determine a position of the vehicle along a road segment represented in the map database 130. This may occur if the vehicle is actually off-road (e.g., not on any road segment, such as in a parking lot, in a field, or outside the coverage region of the map database 130). Alternatively, the vehicle positioning tool 150(2)(1) may determine that the vehicle is off-road if reliable sensor information cannot be obtained. If the vehicle positioning tool 150(2)(1) indicates that the vehicle is off-road, information indicating this off-road status is provided to the data receiving process 170(1). The determination of an electronic horizon requires a valid vehicle position with the vehicle positioned on a specific location of a specific segment. If the vehicle is off-road, the data engine 170 does not calculate an electronic horizon.

(3). Calculation of the electronic horizon

The data engine 170 includes an electronic horizon calculation process 170(3). The electronic horizon calculation process 170(3) determines which road segments and intersections should be represented in the output of the data engine 170. These segments and intersections represented in the output of the data engine 170 are the potential paths the vehicle may follow from the current vehicle position. The extent that each of these potential paths extends from the current vehicle position is determined by the electronic horizon calculation process 170(3). The "electronic horizon" refers to the collection of the roads and intersections leading out from the current vehicle position to the extents determined by the electronic horizon calculation process 170(3). Thus, the "electronic horizon" represents the road ahead of (or possibly behind) the vehicle. The electronic horizon is also a representation of potential driving paths of the vehicle from the current vehicle position. The "electronic horizon" also refers to the collection of data that represents the roads and intersections leading out from the current vehicle position to the aforementioned extents, including the road attributes, road objects, and road geometry of the road segments that form the electronic horizon.

To perform the function of determining the electronic horizon, the electronic horizon calculation process 170(3) obtains the data indicating the vehicle's current position from the data receiving process 170(1). Using the data indicating the vehicle's current position, the electronic horizon calculation process 170(3) obtains data from the map database 130 that relates to all the roads around the vehicle's current position. The data engine 170 includes a component process 170(2) that obtains these data from the map database 130. If the map database 130 includes both a primary database and a supplementary database, the component process 170(2) combines the primary and secondary data for use by the data engine.

After obtaining data that relate to all the road segments around the vehicle's current position, the data engine 170 determines which road segments represent the electronic horizon. This step includes determining the extents (or boundaries) of the electronic horizon. In determining the extents of the electronic horizon, the electronic horizon calculation process 170(3) provides that the potential paths extending from the current vehicle position are sufficiently large so that the driver assistance applications 200 (in FIG. 1) that use the data output by the data horizon program 110 are provided with all the data they may need to perform their functions, given the speed and direction of the vehicle as well as specific requirements of each of the driver assistance applications 200. On the other hand, the electronic horizon calculation process 170(3) builds an electronic horizon as small as possible in order to reduce the computational resources required to build it and also to reduce the computational resources required by the driver assistance applications 200 when using the data included in the electronic horizon.

The extents of the electronic horizon are determined using one or more costing functions, as explained in more detail below. Briefly, starting with the segment upon which the vehicle is currently located, each segment of each path leading away from the current vehicle position is evaluated for possible inclusion in the electronic horizon. The electronic horizon calculation process 170(3) stops evaluating segments to add to a path from the current vehicle position when the path has at least a minimum threshold cost, if possible. The electronic horizon calculation process 170(3) stops calculating an electronic horizon when all segments included in all the paths from the current vehicle position are determined. When the electronic horizon calculation process 170(3) stops calculating an electronic horizon, the extents of the electronic horizon are determined.

According to one embodiment, the electronic horizon is represented by a tree from which the potential driving paths from the vehicle's current location diverge as branches. The electronic horizon calculation process 170(3) forms this tree when determining which road segments and intersections to include in the electronic horizon. The tree that forms the electronic horizon includes components by which each point along each path can be specified and defined within the context of the entire tree structure. In this manner, formation of the electronic horizon is done in a consistent, reliable and reproducible manner. This provides features, such as a level of confidence, is that can be used by the advanced driver assistance systems 200.

(4). Electronic horizon terminology

The components of the electronic horizon are organized so that the driver assistance applications 200 can use the data representing the roads located around the vehicle. The electronic horizon components include the following:

(a) First segment. The road segment upon which the vehicle is located is the "first segment" of the electronic horizon tree.

(b) Root node. The entrance node of the first segment of the electronic horizon is the "root node" of the electronic horizon tree.

(c) Internal node. An "internal node" of an electronic horizon is a node to which at least two segments of the electronic horizon are attached.

(d) Entrance and exit segments. Each internal node of an electronic horizon has one "entrance segment", i.e., a segment on which the vehicle can potentially drive towards that node. An internal node also has one or more "exit segments", i.e., segments on which a vehicle potentially drives away from the current internal node.

(e) Leaf node. A "leaf node" is a node within an electronic horizon where no additional segments are attached.

(f) Accessible sub-tree. Those segments of the electronic horizon that are accessible by legally permitted paths from the first segment of the electronic horizon form the "accessible sub-tree" of the electronic horizon.

(g) Simple path electronic horizon. An electronic horizon is referred to as a "simple path electronic horizon" if the accessible sub-tree of it consists of a linear list of segments only.

(h) Single segment electronic horizon. A simple path electronic horizon is referred to as a "single segment electronic horizon" if the accessible sub-tree of the electronic horizon consists of a single segment only.

(i) Inaccessible segment. An "inaccessible segment" is segment which is connected to a node included in the electronic horizon but which cannot be entered legally from the node. For example, the segment may be a one way street and the direction of the one way restriction is such that it is illegal to drive onto the segment from the node that is part of the electronic horizon. Alternatively, there may be a turn restriction in effect that does not allow a vehicle to turn onto the segment from the node which is part of the electronic horizon. Note that a particular segment may be inaccessible if the vehicle approaches the segment via one node but accessible if the vehicle approaches the segment via a different node. Formation of the electronic horizon may be configured (e.g., through the costing function, as described below) so that inaccessible segments are included in an electronic horizon or alternatively formation of the electronic horizon may be configured so that inaccessible segments are excluded from an electronic horizon.

EXAMPLE

Figure 6:
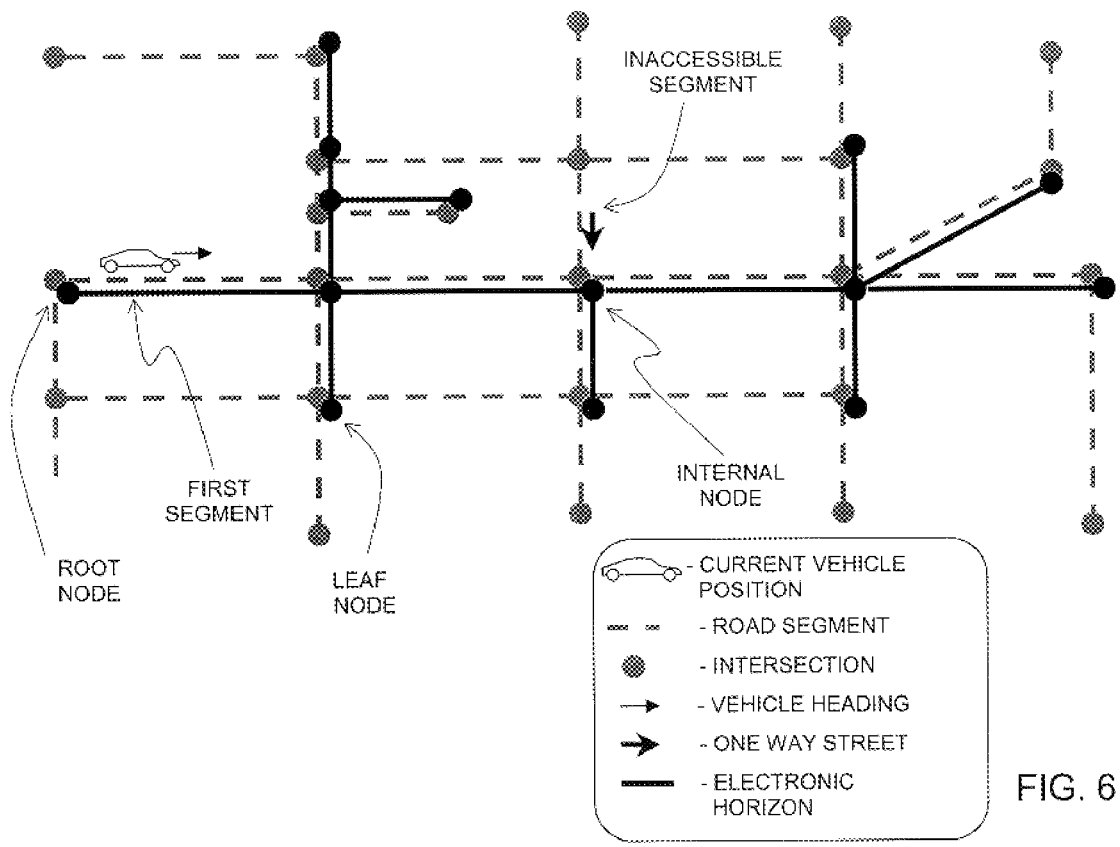
FIG. 6 is an illustration of a portion of a road network with a depiction of an electronic horizon superimposed thereupon.

FIG. 6 illustrates an electronic horizon superimposed on a portion of the road network. In FIG. 6, the inaccessible segment is excluded from the electronic horizon sub-tree.

(5). Component identification of electronic horizon

The electronic horizon includes a means by which each of the paths leading from the current vehicle position out to the extents of the electronic horizon can be uniquely identified. Each of the component parts of an electronic horizon can be identified using segment identifiers, path identifiers, segment descriptors, node descriptors and point descriptors.

Figure 7:
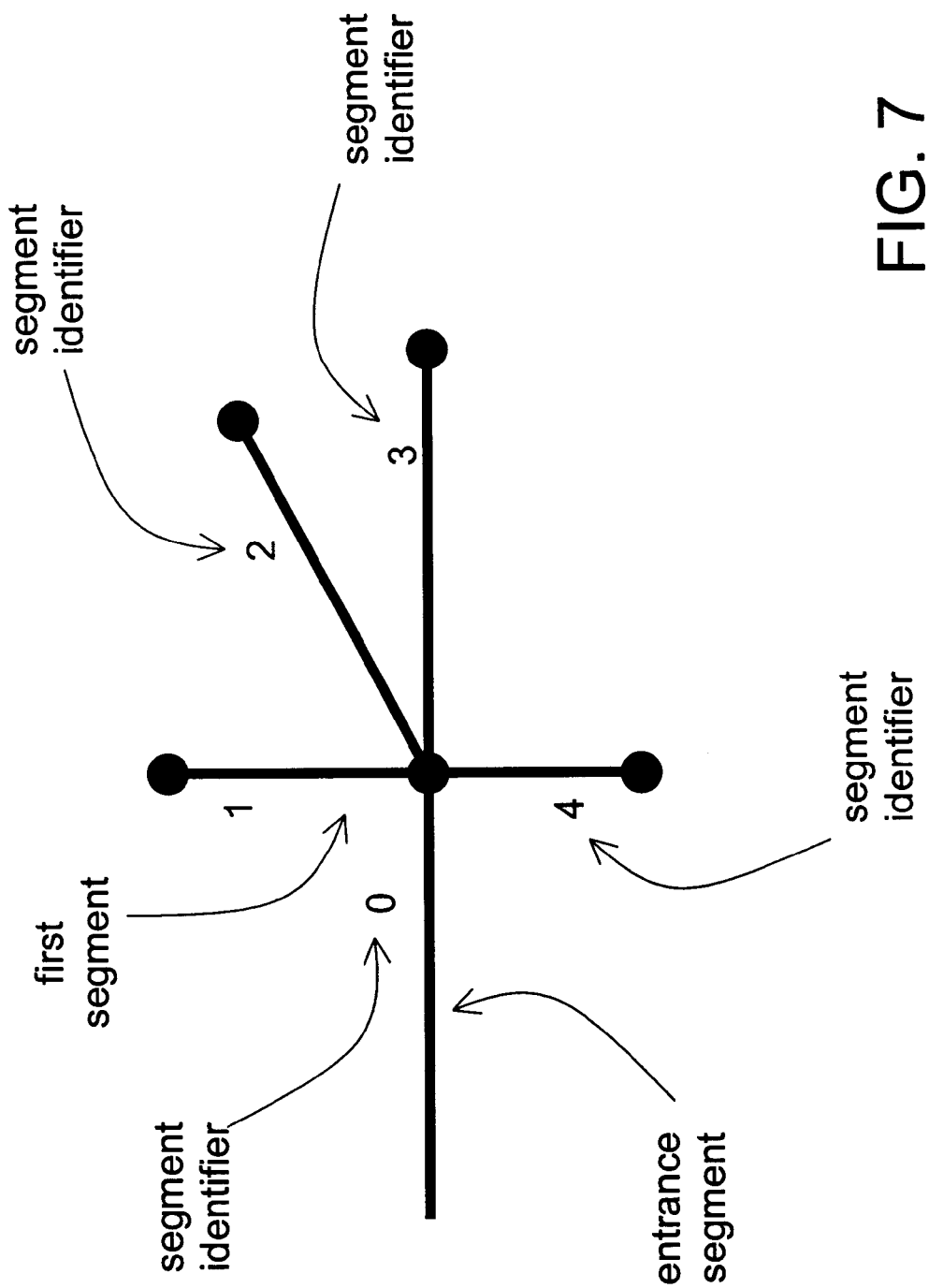
FIG. 7 is an illustration of segments identifiers used when describing paths in an electronic horizon.

(a) Segment identifiers. A "segment identifier" identifies a segment with an index number with respect to a particular node. The entrance segment of a node has an index of 0. Exit segments of a node are indexed starting at 1. All exit segments of a node are marked clockwise. The first segment (i.e., index =1) is the segment that follows the entrance segment in a clockwise direction. It is possible that no exit segment exists for a particular node (e.g., a leaf node). FIG. 7 illustrates the assignment of segment identifiers at an intersection (i.e., a node).

Figure 8:
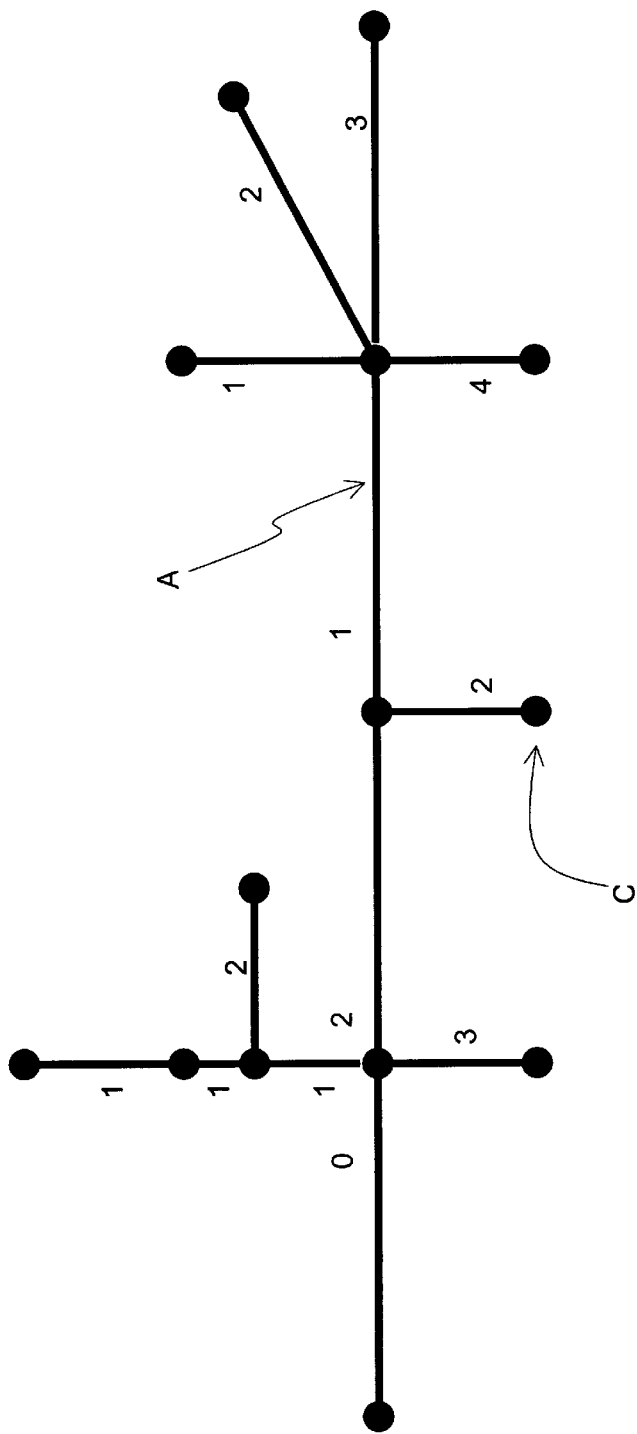
FIG. 8 is an illustration of path descriptors in an electronic horizon.

(b) Path descriptors. A "path descriptor" describes a path by a list of the segment identifiers of that path. Because every path includes the first segment of an electronic horizon, every path descriptor starts with 0. Any segment after the first electronic horizon segment is identified by its segment identifier with respect to its entrance node. FIG. 8 shows an example of how path descriptors are formed. FIG. 8 shows the same electronic horizon as shown in FIG. 6. Next to each segment in the electronic horizon is its segment identifier defined with respect to the entrance node thereto. FIG. 8 also includes a table of path descriptors for each of the paths in the electronic horizon.

Note that under some circumstances, a segment contained in an electronic horizon can be entered by more than one path. If a segment can be entered by more than one path, the segment is included in each of the path descriptors. Thus, a segment can be included more than once in a description of an electronic horizon.

Sometimes it is necessary to define an invalid path. Such a path has a path descriptor of −1.

Figure 9:
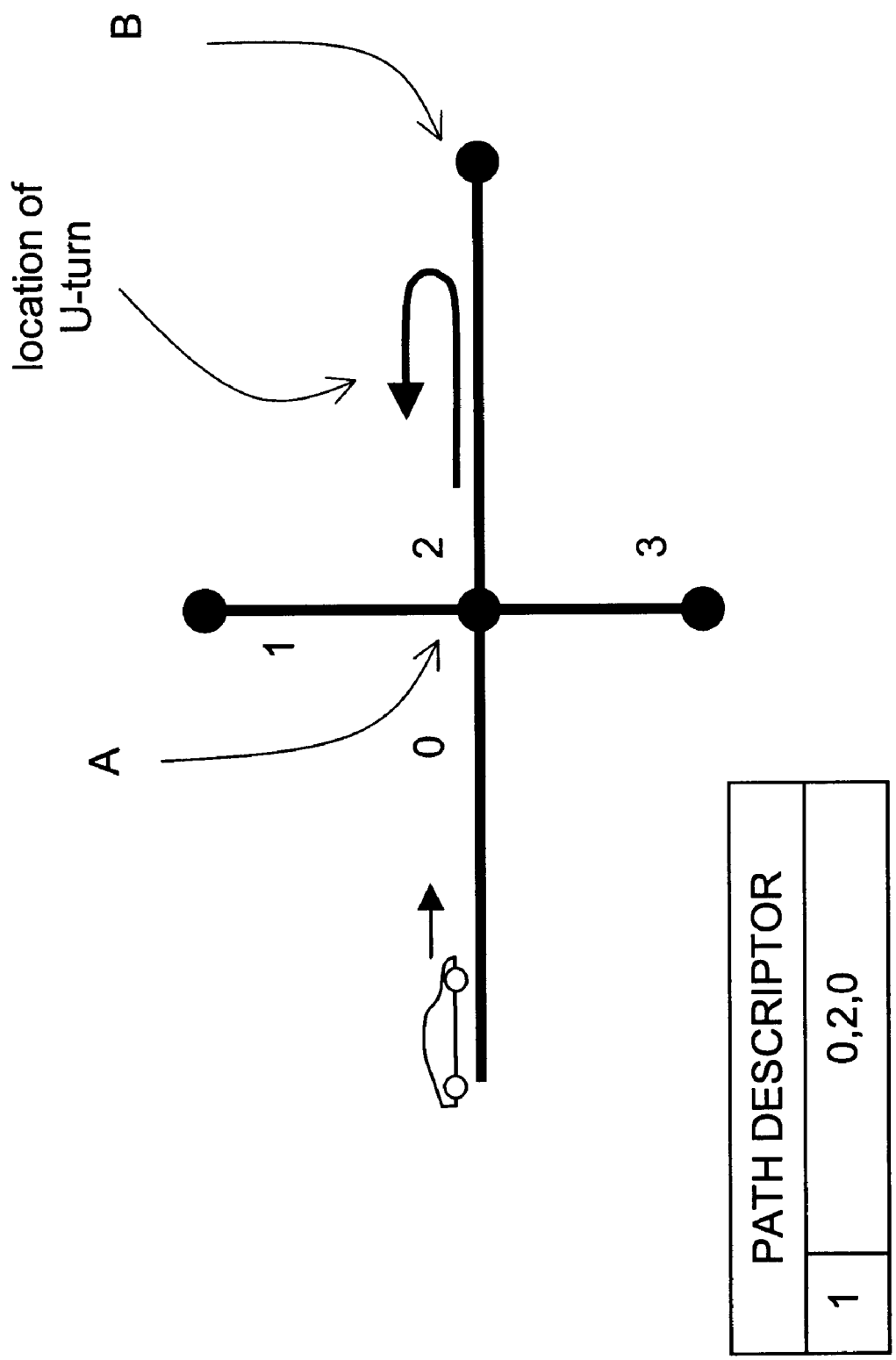
FIG. 9 is an illustration of a path descriptor for a U-turn.

Path descriptors can also be used to describe paths involving U-turns. FIG. 9 shows an example of how a path descriptor can be used to describe a U-turn. In FIG. 9, a vehicle traveling from a current vehicle position to node A, then node B and then back to node A would travel the path 0.2.0. In any path, segment 0 is the segment on which the vehicle travels towards a node. Therefore, to describe a U-turn, segment index 0 is used to indicate that the vehicle exits the node on the same segment it has driven towards the node.

(c) Order of Paths. All paths of an electronic horizon define a complete order. Because the number of paths is finite, a "first path" and a "last path" of an electronic horizon exist. Given two paths descriptors, p1 and p2, this order is defined as follows. Repeatedly compare the individual segment indices of the two path descriptors. In each iteration, the following steps are executed:

First, if the first two individual segment indices are identical, continue by comparing the next pair of segment indices. For example, assume two path descriptors 0.4.3.1 and 0.4.2.2. The comparison computation at this point has reached the second segment index ('4' in both cases).

The two individual segment indices are different. In this case the path descriptor with the smaller segment index value is deemed to be smaller than the path descriptor with the larger of the two values. For example, assume two path descriptors 0.2.3.1 and 0.2.4.2. Comparing the third segment indices '3' and '4' of both path descriptors leads the first path descriptor to be declared as being smaller than the second path descriptor. The comparison operation stops at this point.

The number of segment indices for both paths has been exceeded. The two path descriptors are identical in this case and the path comparison computation stops. An example would be two path descriptors 0.1.2 and the preceding computation has just compared the third of the segment descriptors ('2').

The number of segment indices for the first path descriptor has been exceeded, but there is another segment index still available for the second path dscriptor. In this case, the first path descriptor is deemed to be smaller than the second path descriptor and the path comparison operation stops at this point. For instance, assume path descriptors 0.2.4 and 0.2.4.1.2 with the comparison operation now proceeding to compare the fourth segment index of every path descriptor, but a fourth segment index does not exist in the case of the first path descriptor.

The next test assumes a situation opposite to the preceding situation that is the number of segment indices for the second path descriptor exceeds the number of segment descriptors for the first path descriptor. In this case the first path descriptor is deemed to be larger than the second path descriptor. The path comparison operation stops at this point.

(d) Segment Descriptor. A segment descriptor uniquely identifies a segment with respect to a path in the context of an electronic horizon. A segment is identified by the path descriptor of that path that has the segment to be identified as its last segment. For example, referring again to FIG. 8, the segment labeled A, can be identified as 0.2.1.

(e) Node Descriptor. A "node descriptor" uniquely identifies a node within an electronic horizon. A node descriptor is the path descriptor of that path that ends in the node to be identified. In FIG. 8, the node descriptor of the node labeled C is therefore 0.2.2. The node descriptor for the root node of an electronic horizon has the special value of −1.

(f) Point Descriptor. A point descriptor uniquely identifies any point within an electronic horizon. A point descriptor consists of two parts: (1) the segment descriptor of the segment to which the point belongs and (2) the point index of the point to be identified. In order to be able to distinguish between point descriptors and other descriptors, a colon is used to separate the segment descriptor part of a point descriptor from the point index itself, e.g., "0.1:2" identifies segment "0.1" and point 2.

(6). Costing functions.

(a) Overview

The building of an electronic horizon is that process which determines which segments (and intersections) are part of an electronic horizon and which are not. The first segment of an electronic horizon is the segment on which the vehicle is currently located. Each time another segment is added to an electronic horizon the electron horizon calculation process 170(3) determines whether the exit node of that segment should be expanded further, i.e., whether any or all of the segments attached to the exit node of the segment should be also made part of the electronic horizon. A segment costing function and a node costing function are used for this purpose.

The costing functions provide how certain factors affect building of an electronic horizon. The costing functions allow a driver assistance application (through a configuration process) to specify whether certain factors should affect building of the electronic horizon. The costing functions also allow a driver assistance application to specify (through the configuration process) to what extent each of these factors should affect building of the electronic horizon. The following list includes the factors that can be taken into account by the costing functions.

(1) current vehicle speed;

(2) travel time of the vehicle from the current vehicle location;

(3) driving distance from the current vehicle location;

(4) inclusion of inaccessible segments;

(5) inclusion of circular paths (e.g., a path having the same segment entered more than once);

(6) inclusion of U-turns;

(7) inclusion of node costs (e.g., the cost of turns at intersection); and (8) inclusion of estimated segment travel costs.

The above list is not exclusive and there may be other factors that can be considered by the costing functions.

Using these factors, the costing function determines the extents of an electronic horizon. For example, the extents of the electronic horizon can include all segments within an absolute distance, all segments that are reachable at a current speed of the vehicle within the next n seconds, all segments that are reachable within the next n seconds while traveling at the legal speed limits of the corresponding segments, etc. These factors can be combined in various ways. For example, the extents of an electronic horizon can include a minimum absolute distance combined with a distance which is a function of the vehicle speed and time.

(b) The process of computing cost values

The process of building an electronic horizon uses two threshold cost values. The first threshold cost value is referred to as the "building threshold cost" and the second threshold cost is referred to as the "minimum path cost."

The process of computing cost during the building process of an electronic horizon operates recursively. First, some cost (through the segment cost function) is associated with the "travel cost" of the vehicle from the vehicle position (on the first segment of the electronic horizon) to the exit node of the first segment of the electronic horizon. The building process now continues in the following recursive fashion:

For any segment attached to the exit node of the current electronic horizon segment, a node cost is added. This node cost models the cost associated with turning from the current onto the attached segment and it is determined by the node cost function. Then, a segment cost is added which reflects the cost of the vehicle travelling from the entrance node of a newly attached segment to its exit node.

At each step, the current cost is compared with a value for the "building threshold cost" (or "first threshold"). The building threshold cost is used as a threshold to determine when the process extending the path from the current vehicle position should be stopped.

Once the cost of a path reaches or exceeds the building threshold cost, the building process stops for that path. Then, the same building process is applied to the next path, and so on until all the paths leading out from the current vehicle position are determined and each path has a cost at least as great to the building cost threshold, if possible. (Note that in some cases, it may not be possible to extend a path out to the building threshold cost. For example, if a road ends in a dead end, the path may end before the building threshold cost is reached.)

Once an electronic horizon is built, the cost associated with each of the paths in the electronic horizon is at least as large as the building threshold cost value (if possible). As the vehicle travels forward and the vehicle position changes, data indicating the new position are collected by the sensors (120 in FIG. 1). The vehicle positioning tool (150(2)(1) in FIG. 4) uses these new data to determine a new vehicle position. Data indicating the new vehicle position are sent from the vehicle positioning tool 150(2)(1) to the data engine (170 in FIG. 5) where the data are received by the data receiving component 170(1) which in turn passes the data to the process 170(3) that calculates the electronic horizon. Then, the electronic horizon calculation process 170(3) determines whether a new electronic horizon has to be built as a result of the new vehicle position or whether the previous electronic horizon can be reused (Step 170(3)(5)). As part of making this determination, the electronic horizon calculation component 170(3) adjusts the costs of all the paths in the electronic horizon program to take into account the data indicating the new vehicle position. When adjusting the costs of the paths, the costs of the paths decrease because the vehicle position advances into the electronic horizon. At this point, the electronic horizon calculation process 170(3) determines whether any path in the electronic horizon has a cost less than the minimum path cost (i.e., the "second threshold"). If all the paths in the electronic horizon have costs that exceed the minimum path cost, a new electronic horizon is not built. Instead, a new electronic horizon is determined using the paths that had been already determined for the previous (i.e., existing) electronic horizon. When a new electronic horizon is determined in this manner, the paths (and costs thereof) are updated to take into account the new vehicle position. When a new electronic horizon is determined in this manner, one or more segments of a path, or even an entire path, from the previous electronic horizon may be eliminated.

As data indicating new vehicle positions are received in the data engine 170, the calculation component 170(3) determines new electronic horizons in this manner until any path cost is less than the minimum path cost. When a new vehicle position causes any path cost in an electronic horizon to fall below the minimum path cost threshold, a completely new electronic horizon is built (i.e., all the paths starting from the current vehicle position are determined, in the manner described above, so that the cost of each path is at least the building threshold cost).

Use of two threshold cost values has several advantages. Using two cost threshold values provides for a safety margin. This safety margin is configurable by the driver assistance applications 200 that use the electronic horizon. Another advantage of using two thresholds is that an entirely new electronic horizon does not have to be computed as frequently, thereby reducing the computational requirements associated with the building of the electronic horizon. Another advantage of using two thresholds is that the memory required to store the data associated with an electronic horizon may be reduced (as described below in connection with the data repository 180).

The values of the building threshold cost and the minimum threshold cost are configurable. In one embodiment, these values are configured by the driver assistance applications that use the electronic horizon.

(c) Computation of the path costs when calculating the electronic horizon.

As stated above, when calculating an electronic horizon, the cost associated with the addition of each node and segment to the electronic horizon is determined and added to the costs already accumulated for the path in order to determine whether expansion of the electronic horizon along that path should stop. When determining the cost of adding a segment to a path, the electronic horizon calculation function 170(3) uses a segment cost function 170(3)(2) and when determining the cost of adding a node to a path, the electronic horizon calculation function 170(3) uses a node cost function 170(3)(3).

(d) The segment cost function

The segment cost function 170(3)(2) determines the cost associated with a vehicle travelling from the entrance node to the exit node of a segment. In the case of the first segment the cost is limited to the travel cost of the vehicle from the current vehicle location to the exit node of the first segment.

According to one embodiment, the segment cost function 170(3)(2) has access to certain information about a segment for which a cost is computed. The information about the segment is obtained from the map database 130. The segment cost function 170(3)(2) may use some of the data, all the data, or none of the data, depending on how the segment cost function has been configured. According to one embodiment, the segment cost function 170(3)(2) has access to the following information about a segment:

(1). the length ("L") of the segment, (2). and estimated travel cost ("SETC"), and (3). whether travel along the segment in the current direction is legal ("TDI"). (The TDI information allows the driver assistance application to control, through a configuration process, whether one way streets oriented opposite to the current vehicle travel direction are included in an electronic horizon.)

With respect to the first segment, the length is the distance from the current vehicle location to the exit node of the first segment and the estimated travel cost is the estimated travel cost from the vehicle location to the exit node of the first segment.

In the segment cost function 170(3)(2), factors are associated with combinations of these data items. The segment cost function 170(3)(2) is configured by selecting values for each of these factors. For example, a legal-length cost factor ("FLEN_Illegal") can be defined and used as a factor of the segment length ("L") and the legal travel direction ("TDI"). An illegal-length cost factor ("FLEN_Illegal") can be defined and used as a factor of the segment length ("L") and the legal travel direction ("TDI"). An estimated-travel cost factor ("FEST_Legal") can be defined and used as a factor of the travel cost ("SETC") and the legal travel direction ("TDI"). Likewise, an illegal-direction-estimated-travel cost factor ("FEST_Illegal") can be defined and used as a factor of the travel cost ("SETC") and the legal travel direction ("TDI").

By selection of values for each of these factors, the relative importance of each of the different types of available information about a segment can be determined with respect to expansion of the electronic horizon. In this manner, the segment cost function can be configured. This configuration may be made based on input from a driver assistance application or alternatively, default configuration values may be used.

(e) The node cost function

The electronic horizon calculation process 170(3) also includes a node cost function 170(3)(3). The node cost function 170(3)(3) is used to compute the cost associated with the addition of a node to a path when determining an electronic horizon. The node cost represents the cost associated with the transition (e.g., turn right, left, or go straight) from one segment to another.

According to one embodiment, the node cost function 170(3)(3) has access to certain information about a node for which a cost is computed. The information about the node is obtained from the map database 130. The node cost function 170(3)(3) may use some of the data, all the data, or none of the data, depending on how the node cost function 170(3)(3) has been configured. According to one embodiment, the node cost function 170(3)(3) has access to the following information about a node:

(1). whether the turn across the node is legal ("TL"). A turn can be illegal because a turn restriction is in place (e.g., no left or right turn) or the successor segment is a one way street which would be entered the wrong one way.

(2). the turn angle from the entrance segment to the successor segment ("TA"). The value may be expressed in degrees.

(3). an estimated node cost ("EnodeCost").

(4). a value ("SecondSegment") which indicates whether the second segment is already part of the current path for which further expansion is currently being explored.

As with the segment cost function 170(3)(2), factors can be associated with these data items in the node cost function 170(3)(3). The node cost function 170(3)(3) is configured by selecting values for each of these factors. For example, a turn-angle factor ("F_TA_Legal") is applied to the turn angle between the current segment and the next segment, if the turn is legal. (A turn is legal if neither turn restrictions nor one way restrictions prevent a turn from being executed.) This factor can be used to associate higher costs with sharper turn angles and vice versa. A node-cost factor ("F_SDAL_ENodeCost_Legal") can be applied to the node cost ("EnodeCost") from the database 130. A constant cost ("Cost_UTurn") can be added in the case the turn is legal and the turn is a U-turn. By choosing an appropriately high value, U-turns can be completely suppressed. An illegal-turn factor ("F_TA_Illegal") can be applied to the turn angle between the current and the next segment if the turn is illegal. A constant-cost factor ("C_Illegal_Turn") can be added if the turn is illegal. A constant-cost factor ("Cost_SecondSegment") can be added if the next segment is a segment which is already part of the current path and both segments have the same direction.

Selection of values for each of the factors in the node cost function provides for assigning the relative importance of each of the different types of available information about a node with respect to expansion of the electronic horizon. In this manner, the node cost function can be configured. This configuration may be made based on input from a driver assistance application or alternatively, default configuration values may be used.

(f) Configuration of the costing functions

As stated above, the building threshold cost and the minimum path cost may be configured using input from one or more of the driver assistance applications. These thresholds may be fixed values or may be computed values. For example, according to one embodiment, the minimum path cost may be made a function of the vehicle speed. According to this embodiment, the current vehicle speed ("VSP") is available from the sensors and continuously updated in the data provided to the electronic horizon calculation process 170(3).

A value for a minimum path cost factor ("SpeedF") is determined by one of the driver assistance applications. Using this information, the minimum path cost ("MinCost") is computed as follows:

$$MinCost = VSP * SpeedF$$

The building threshold cost value may also be computed. In one embodiment, the building threshold cost value ("MaxCost") may be made a function of the minimum path cost according to the following relationship:

$$MaxCost = MinCost * MaxF,$$

where MaxF is a factor applied to the minimum path cost.

As mentioned above, the costing functions may be configured using input from the driver assistance application. One way to configure the costing functions is to ensure that all paths within the electronic horizon have a certain minimum length, that U-turns are to be ignored, and that inaccessible segments are not made part of an electronic horizon. This setup can be achieved as follows:

In the segment cost function, FLEN_Legal is set to 1. This makes the cost identical to a segment's length (or in the case of the first segment identical to the distance of the vehicle to the exit node of the first segment). Also in the segment cost function, FLEN_Illegal is set to zero to suppress inaccessible segments. Also in the segment cost function, FEST_Legal and FEST_illegal are both set to zero. This way, any estimates of travel times are ignored. In the node cost function, F_TA_Legal and F_SDAL_ENodeCost_Legal are set to 0 thereby eliminating any costs for legal turns. Cost U-turn is set to 100,000 to eliminate any U-turns. F_TA_Illega is set to 0 but C_Illegal_Turn is set to 100,000 to eliminate any inaccessible segments or illegal turns. Cost_SecondSegment is set to 100,000 to eliminate the same segment being part of any path twice.

(7). Primary Path (a) Overview

Some driver assistance applications require the processing of all possible paths within an electronic horizon (i.e., accessible and inaccessible paths). However, some driver assistance applications use a "primary path." A "primary path" is one specific path of the one or more potential paths within an electronic horizon. The primary path is the most likely path upon which the vehicle is expected to travel. The data horizon program 110 includes a feature by which a primary path can be determined and identified to a driver assistance application.

There are two aspects to the computation of the primary path. A first aspect is an estimation of the most likely driving path based on the local road geometry. A second aspect is the use of route information, if available. These aspects are discussed below.

(b) Most Likely Path

The data engine 170 of the data horizon program 110 includes a primary path function 170(6). Included in the primary path function is a function 170(6)(1) that calculates a local-road-network-based most likely path ("LRNBMLP"). The function 170(6)(1) attempts to estimate how the vehicle will continue to travel within the current electronic horizon taking into account only the local road network. The function 170(6)(1) computes a single path as the LRNBMLP. The function 170(6)(1) computes the LRNBMLP as follows. The function 170(6)(1) includes the first electronic horizon segment in the LRNBMLP. Then, the following steps for the selection of the next segment are repeatedly executed by the function 170(6)(1) until a leaf node of the electronic horizon is found.

If only one accessible segment is attached to a node, that segment is chosen.

If more than one accessible segment is attached to a node, then from among all accessible segments the segment with the highest functional class is chosen. If two or more accessible segments have the same functional class which is higher than the functional class of each of the other segments, the segment with the highest functional class with the smallest turn angle is chosen. If there are two segments with the highest functional class and the same turn angle (e.g., one being a left and the other being a right turn), the right turn is chosen over the left turn.

A driver assistance application may chose to have a LRNBMLP determined in this manner. Alternatively, the driver assistance application may chose not to have the LRNBMLP determined in this manner.

(c) Route-based path

As mentioned above, another aspect of determining a primary path of a vehicle is to use route information. Some vehicles include hardware and software that can calculate a route to desired destination. As mentioned above in connection with FIG. 4, in a present embodiment, a route calculation tool 150(2)(3) is included among the navigation applications 150(2). The route calculation tool 150(2)(3) can be used to calculate a route to a desired destination. In one embodiment, the route calculation tool 150(2)(3) provides an output in the form a data route ("R"). The data route is a list of consecutive and directed segments describing a legal way for a vehicle to drive from the first to the last segment of the route. A "route sub-path" of a route within some given electronic horizon is that path within the electronic horizon that matches some (or all) segments of a given route. Given a route, it is possible that the route is not contained (at least partially) within the electronic horizon. In this case, the route sub-path is undefined (and therefore identified by the path descriptor of −1).

The primary path function 170(6) includes a function 170(6)(2) that attempts to calculate a route-based path. A route-based path is that part of a calculated route which is located within an electronic horizon. Inputs to the function 170(6)(2) include data indicating the route R and data ("E") indicating the calculated electronic horizon. As a first step, the function 170(6)(2) determines whether a route-based path can be defined for the electronic horizon. To perform this step, the function 170(6)(2) attempts to locate the first segment of the electronic horizon in the calculated route R. If the first segment of the electronic horizon cannot be found in the calculated route R, the computation stops and the route-based path is undefined (i.e., there is no route-based path). However, if the first segment of the electronic horizon matches one of the segments in the calculated route R, the route-based path is defined. (Note that in order for the first segment of the electronic horizon to match one of the segments in the calculated route, the function 170(6)(2) requires that the direction of travel along the segment in both the electronic horizon and the calculated route be the same.) After the first segment of the electronic horizon is found in the calculated route, the function 170(6)(2) continues to attempt to match segments from the paths in the electronic horizon E with segments from the calculated route R. As with the first segment, the function 170(6)(2) requires that the direction of travel on the matching segments be the same. This matching process continues until no more segments from the paths of the electronic horizon can be found among the segments of the route. Matches are no longer found because a segment from the route for which a match is sought in E is not contained in E (i.e., because the electronic horizon E does not extend beyond some node) or the last segment of the route was reached and therefore no additional segments of R can be matched in E.

(d) Computing the primary path

The primary path computation function 170(6) computes a primary path using the outputs from the most likely path function 170(6)(1) and the route-based function 170(6)(2). If a route R has been defined and the route-based function 170(6)(2) was able to determine a route-based path based on R, then that route-based path of R is selected as the primary path. However, if either a route has not been defined or it was not possible to compute a route-based path, the local road network most likely path (LRNBMLP) is used. An advantage of this method is to assume that the driver will follow a calculated route, if he/she has entered route information. However, if no route information is available, the local road network most likely path is the best estimate that can be provided.

(8). Determining the contents of the newly built electronic horizon.

Reference is made again to FIG. 5. When the calculation process 170(3) has built a new electronic horizon (as opposed to determining a new electronic horizon by adjusting the vehicle position and path costs from the previous electronic horizon), the contents for the new electronic horizon data structure are obtained. The data engine 170 includes a component process 170(4) that performs this function. The process 170(4) receives data from the electronic horizon calculation process 170(3) that indicates the paths (and consequently which segments and nodes) are to be represented in the electronic horizon data structure. Upon receiving this data, the electronic horizon content formation process 170(4) obtains from the map database 130 the necessary data for formation of the electronic horizon data structure. The data structure formed by the electronic horizon content formation process 170(4) contains the relevant data about the roads and intersections in the electronic horizon. This data structure forms the output 171 of the data engine 170.

The types of data that the electronic horizon content formation process 170(4) obtains from the map database 130 are determined by a configuration process. This configuration process may be performed during a manufacturing stage of the advanced driver assistance systems or during an initialization or setup process of the advanced driver assistance systems. In one embodiment, the configuration controller 165 receives data from one or more driver assistance applications 200 that indicate the types of data that should be included in the electronic horizon. In turn, the configuration controller 165 provides data to the process 170(4) to indicate the types of data attributes associated with segments and nodes should be obtained for inclusion in the electronic horizon data structure. Based on these inputs, the content formation process 170(4) obtains the necessary data from the map database 130 to include in an electronic horizon data structure whenever a new electronic horizon is built.

When a newly built electronic horizon data structure have been obtained and stored in the appropriate structure, the contents of the structure are output from the data engine 170 to the data repository 180. The data engine 170 includes a component process 170(8) that provides this output 171.

As mentioned above, under some circumstances (e.g., an off-road condition), an electronic horizon cannot be calculated. If an electronic horizon cannot be calculated, the process 170(4) does not obtain any data for an electronic horizon data structure from the map database 130. Under these circumstances, the content formation process 170(4) provides no output or alternatively the content formation process 170(4) provides an empty electronic horizon, i.e., indicating that no electronic horizon has been determined for the vehicle position.

There is another occasion when an empty electronic horizon is provided. It is possible that the vehicle positioning tool 150(2)(1) reports the vehicle to be traveling against the legal driving direction of a one way street. In this case, the electronic horizon calculation process 170(3) returns the appropriate state information with the electronic horizon in essence being empty.

If the calculation process 170(3) has been configured to provide a primary path (instead of an entire electronic horizon), the electronic horizon content formation process 170(4) obtains the data from the map database 130 needed for an electronic horizon data structure that includes only the primary path. (Alternatively, an electronic horizon including all the paths is provided along with data separately indicating the primary path.) If the calculation process 170(3) has been configured to provide a primary path and a primary path cannot be determined, the content formation process 170(4) provides an output indicating that no primary path has been determined for the vehicle position.

In the embodiment shown in FIG. 5, the process 170(4) of obtaining data for the electronic horizon is shown as separate from the process 170(3) of determining the electronic horizon. In alternative embodiments, these processes may be combined so that the data contained in the electronic horizon is obtained and the electronic horizon is built as the paths that make up the electronic horizon are determined.

(8). Providing the electronic horizon.

As mentioned above, according to a present embodiment, a new electronic horizon is not necessarily built each time a new vehicle position is obtained. Instead, the previous electronic horizon can be reused if all the path costs of the previous electronic horizon still exceed the minimum threshold cost after adjustment for a new vehicle position. Under these circumstances, the data engine 170 provides an output 172 indicating a new electronic horizon for the new vehicle position that uses the paths determined for a previous electronic horizon. The data engine 170 includes an electronic horizon output process 170(7) that performs this function. The electronic horizon output process 170(7) provides this output 172 to the data repository 180, as explained in more detail below. According to one embodiment, the electronic horizon output process 170(7) provides an output for each receipt of data indicating a new vehicle position. According to a present embodiment, the component 170(7) that provides the output 172 defining an electronic horizon is separate from the component 170(8) that provides the contents of an electronic horizon. The output 171 of the electronic horizon content output process 170(8) includes all the necessary data attributes associated with all segments and nodes in all the paths forming an electronic horizon. The output 172 of the electronic horizon output process 170(7) includes only a reference to one of the outputs 171 that contains the data contents of an electronic horizon and an indication of the vehicle position relative to the referenced data contents.

F. The data repository 180

Figure 10:
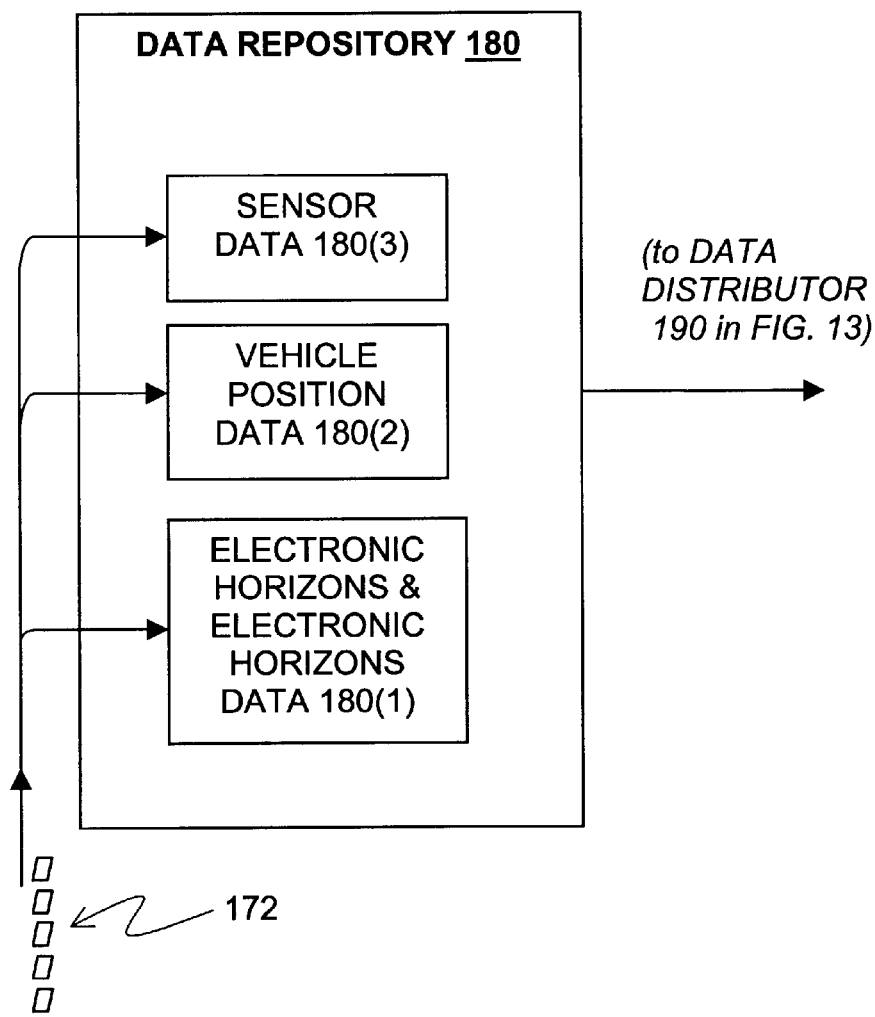
FIG. 10 is a block diagram showing components of the data repository in FIG. 1.
Figure 11:
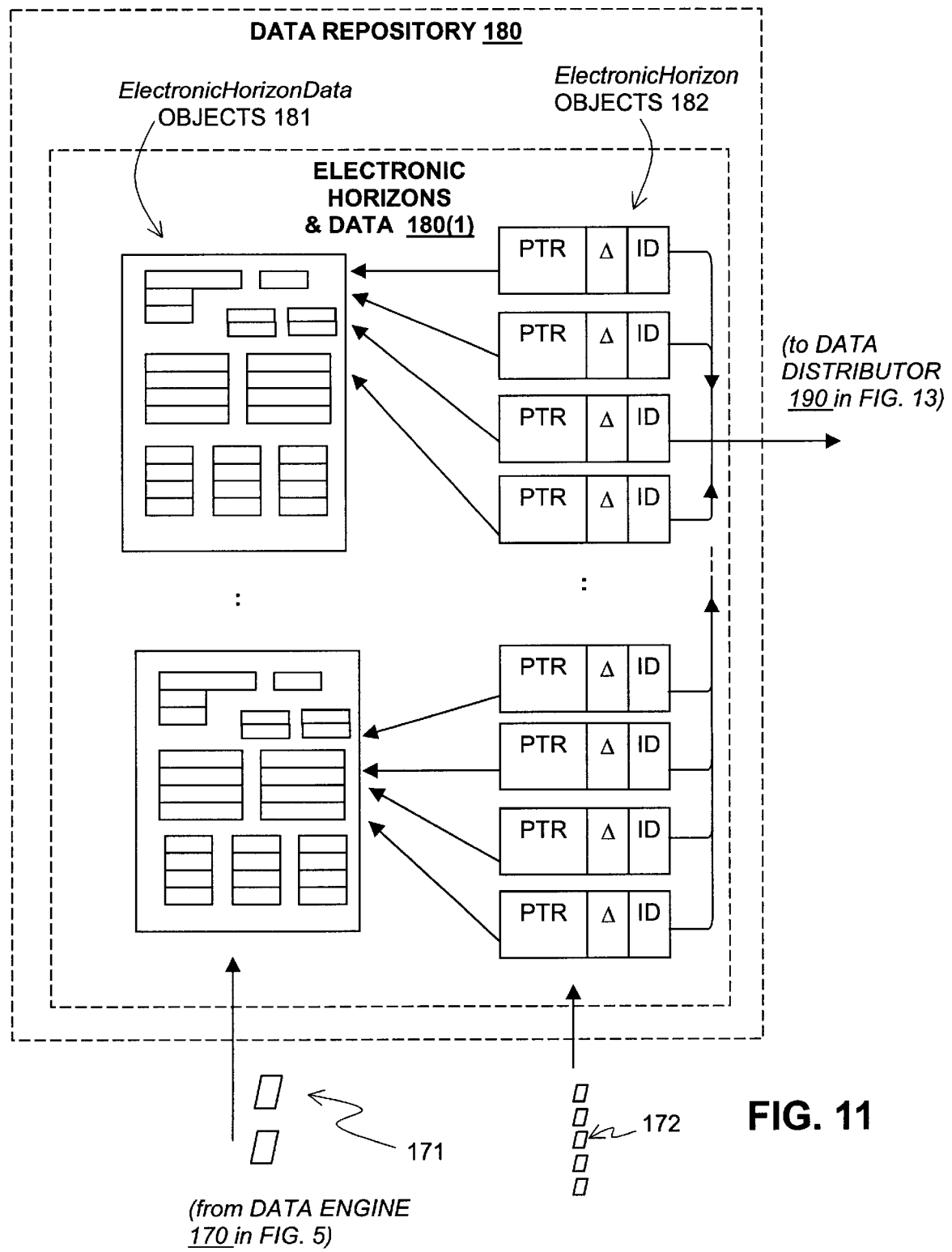
FIG. 11 is a block diagram showing components used for the storage of electronic horizon data in the data repository in FIG. 10.
Figure 12:
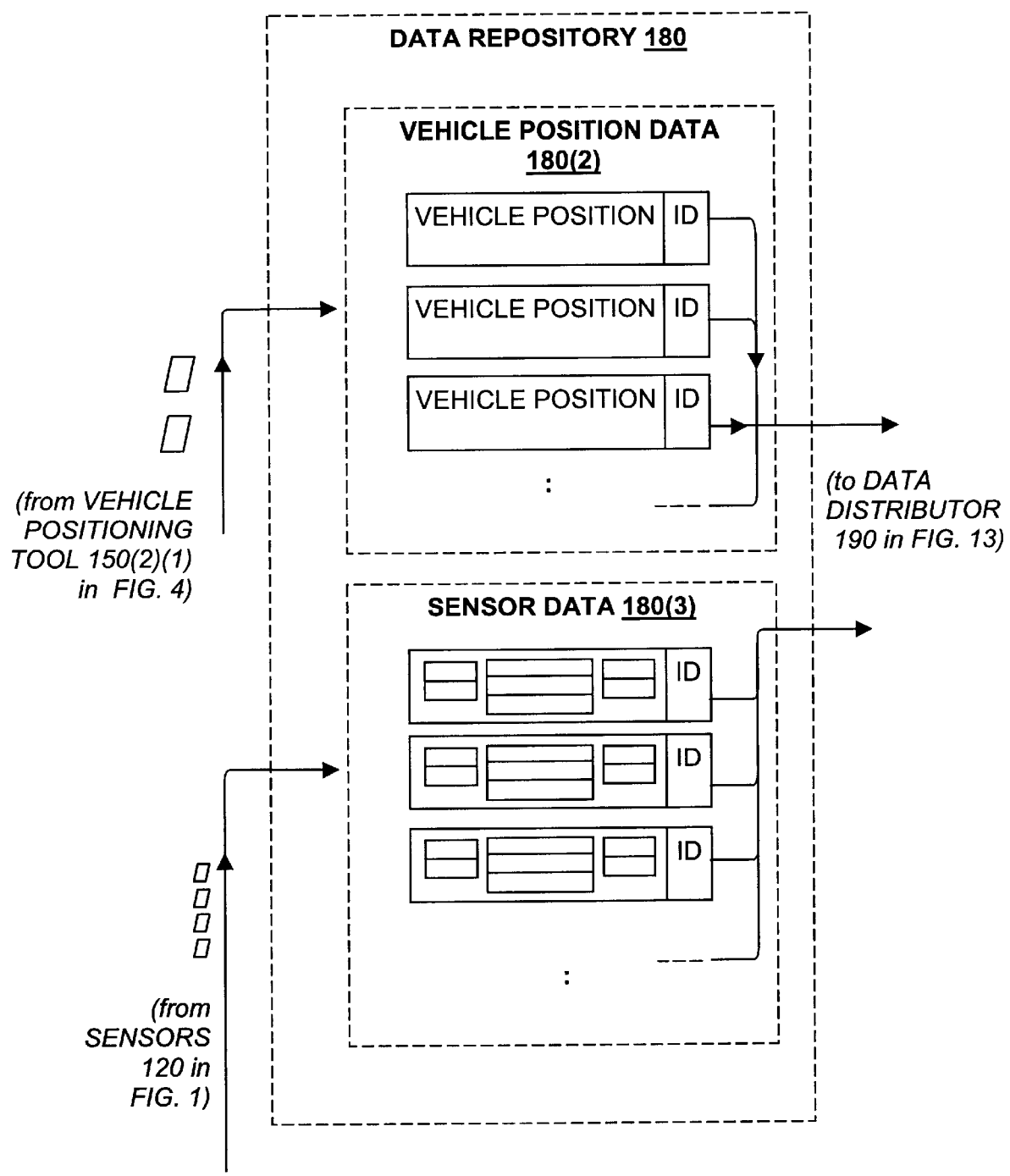
FIG. 12 is a block diagram showing additional components of the data repository in FIG. 10.

As stated above in connection with FIG. 1, the data repository 180 is the component of the data horizon program 110 that contains the latest data readings. An embodiment of the data repository component 180 is shown in FIGS. 10–12. As shown in FIG. 10, the data repository 180 contains three different types of data. First, the data repository 180 holds data 180(1) representing the electronic horizon that had been determined by the data engine 170. According to one embodiment, the data 180(1) includes the attribute information about the segments and nodes in the electronic horizon. The attribute information about the segments and nodes in the electronic horizon may include some or all the attributes identified in FIGS. 3A and 3B. Second, the data repository 180 holds data 180(2) representing the vehicle position. The data 180(2) representing the vehicle position is that data determined by the vehicle positioning tool (150(2)(1) in FIG. 4). The data repository 180 may obtain the data 180(2) representing the vehicle position directly from the vehicle positioning tool 150(2)(1) or the data 180(2) representing the vehicle position may be obtained from the data engine 170. Third, the data repository 180 holds sensor data 180(3). The sensor data 180(3) may be raw sensor data obtained directly from the sensors (120 in FIG. 1) or alternatively the sensor data 180(3) may be obtained from the data engine 170.

Referring to FIG. 11, with respect to the electronic horizon data 180(1), the data repository 180 holds at least the set of data representing the most recent electronic horizon that had been determined by the data engine 170. In one embodiment, the data repository 180 holds several sets of data representing several electronic horizons. These several sets of data held in the data repository 180 are those sets created most recently by the data engine 170. For example, the data repository 180 may hold the ten most recent sets of data representing the ten most recent electronic horizons that had been determined by the data engine 170 although a number greater or lesser than ten may also be suitable. The number of sets of data retained by the data repository 180 may be configured using input from the driver assistance applications 200 via the configuration controller (165 in FIG. 1). Each set of data in the data repository 180 is assigned an identification number or code by which it can be identified.

According to an embodiment shown in FIG. 11, the data repository 180 does not necessarily hold complete sets of data for each electronic horizon retained therein. Instead, the data repository 180 implements a handle-container mechanism. This handle-container mechanism is similar to mechanisms used in object oriented programming to handle large objects. Using the handle-container mechanism reduces the storage and handling requirements for multiple sets of data representing corresponding multiple electronic horizons.

Use of a handle-container mechanism for storage of electronic horizons in the data repository 180 is facilitated by the manner in which electronic horizons are calculated by the data engine 170. As mentioned above, according to one embodiment, a new electronic horizon is not necessarily built each time data indicating a new vehicle position is obtained. Instead, a new electronic horizon is built only when a path from the previous electronic horizon falls below a minimum path threshold after taking into account a new vehicle position.

According to the embodiment shown in FIG. 11, a class ElectronicHorizonData is defined and a class ElectronicHorizon is defined. The objects 181 in the ElectronicHorizonData class contain all the information (i.e., data attributes) needed to represent an electronic horizon. Additionally, each ElectronicHorizonData object 181 contains a reference count. The reference count indicates how many other objects are using the ElectronicHorizonData object 181.

Each object 182 in the ElectronicHorizon class contains three pieces of information: a pointer, a delta distance, and a handle (i.e., ID). The pointer points to the applicable ElectronicHorizonDaobject 181. The delta distance in an ElectronicHorizon object 182 is a value that indicates the difference in the vehicle position of the ElectronicHorizon object 182 relative to the vehicle position in the referenced ElectronicHorizonData object 181. (As long as the vehicle remains on the same segment and has moved such that the most recently used electronic horizon data can be reused, no new electronic horizon data is computed.)

Use of the handle-container mechanism for storage and use of electronic horizons affords several advantages. Electronic horizons would take up a lot of memory if they were stored as ordinary class objects. However, in the embodiment of FIG. 11, the EleetronicHorizon object 182 contains only three items of information and accordingly may be relatively small compared to the ElectronicHorizonData object 181. Copying an ElectronicHorizon object 182 implies copying the data contained in the ElectronicHorizon object 182, but as far as the associated electronic horizon data is concerned, only a pointer to the respective ElectroniHorizonData object 181 is copied. When the ElectronicHorizon object 182 is copied, the reference count in the applicable ElectronicHorizonData object 181 is incremented indicating that the ElectronicHorizon object 182 is using the data. An ElectronicHorizonData object 181 is deleted when all ElectronicHorizon objects 181 referring to it cease to exist.

Reference is made to FIG. 12. As stated above, the data repository 180 also contains vehicle position data 180(2). The vehicle position data 180(2) contained in the data repository 180 includes data indicating the most recent one or more vehicle positions that had been determined by the vehicle positioning tool (150(2)(1) in FIG. 4). The number of vehicle positions included in the vehicle position data 180(2) retained by the data repository 180 may be configured. In one embodiment, the number of vehicle positions represented by the vehicle position data 180(2) contained in the data repository 180 corresponds to the number of electronic horizons included in the electronic horizon data 180(1). Alternatively, the number of vehicle positions represented in the vehicle position data 180(2) contained in the data repository 180 may be greater than the number of electronic horizons included in the electronic horizon data 180(1). The vehicle position data 180(2) may be retained separately from the electronic horizon data 180(1) or alternatively the vehicle position data 180(2) may be included with the electronic horizon data 180(1). As shown in FIG. 12, each set of vehicle position data 180(2) may be assigned an identification number or code by which it can be identified.

Also as stated above, the data repository 180 contains sensor data 180(3). The sensor data 180(32) contained in the data repository 180 includes the most recent sensor readings from the sensors 120 (in FIG. 1). The number of sensor readings included in the data repository 180 may be configured. In one embodiment, the number of sensor readings contained in the data repository 180 corresponds to the number of electronic horizons included in the electronic horizon data 180(1) or the number of vehicle positions included in the vehicle position data 180(2). Alternatively, the number of sensor readings contained in the data repository 180 may be a different number. As shown in FIG. 12, each set of sensor data 180(3) may be assigned an identification number or code by which it can be identified.

In addition to the electronic horizon data 180(1), the vehicle position data 180(2) and the sensor data (3), the data repository 180 may also contain other kinds of data.

G. The data distributor 190

Figure 13:
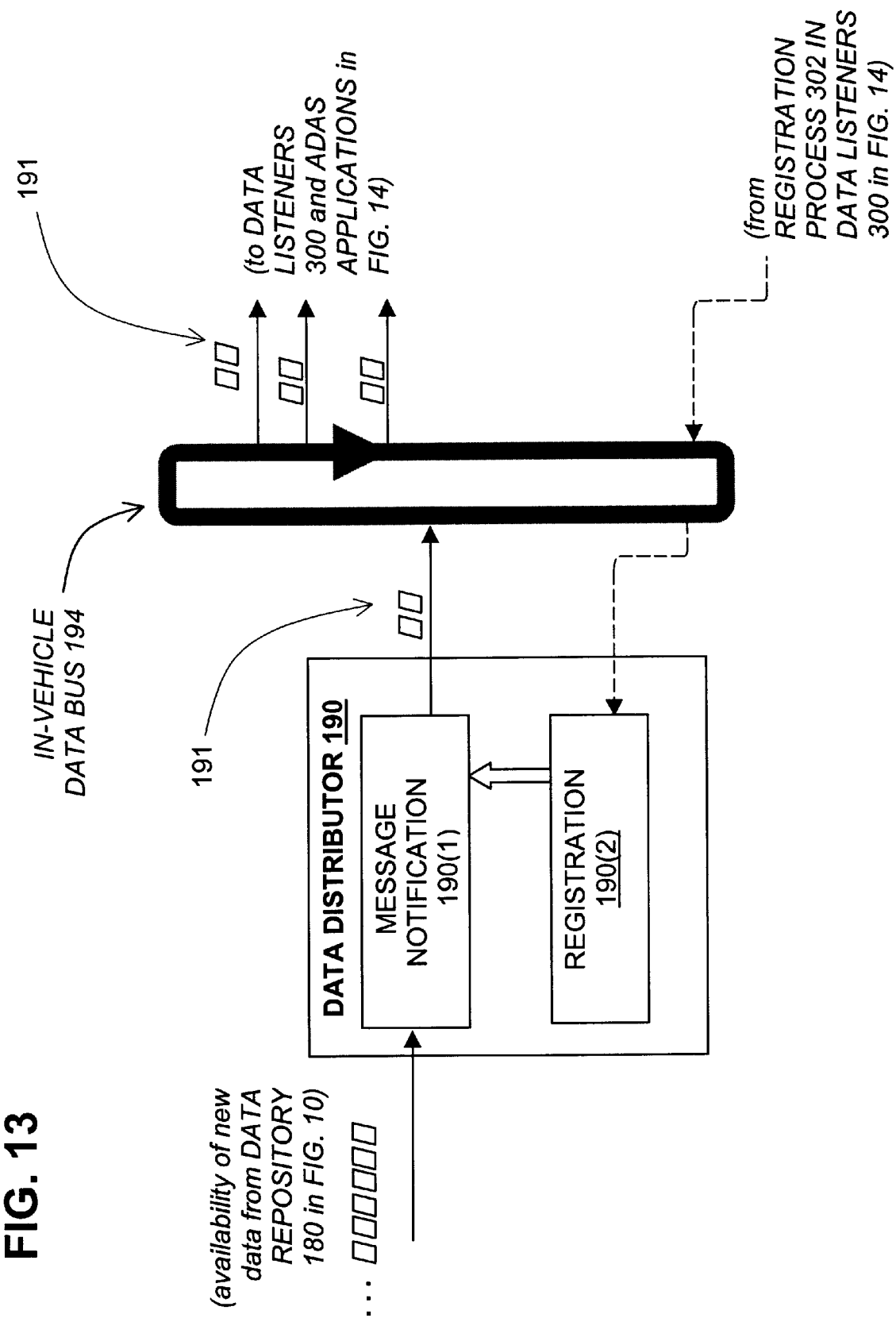
FIG. 13 is a block diagram showing components of the data distributor in FIG. 1.

FIG. 13 shows the components of the data distributor 190. The data distributor 190 is that component of the data horizon program 110 that initiates the sending of data from the data repository 180 to the driver assistance applications 200 that use the data. In order to reduce processing requirements, the data distributor 190 includes a component 190(1) that sends messages 191 indicating the availability of new data. These messages are sent to over a vehicle data bus 194 to each driver assistance process 200 that uses data stored in the data repository 180. In an embodiment in which there are several driver assistance processes 200 that use data stored in the data repository 180, the messages 191 from the data distributor 190 are broadcast over the data bus 194 to each process 200 that uses the data. Each driver assistance process 200 that uses data stored in the data repository 180 registers with the data distributor 190 to receive the messages about the availability of new data.

With respect to electronic horizon data (180(1) in FIG. 10), the data distributor 190 broadcasts messages about the availability of new data once each cyclic execution of the data engine 170. With respect to the vehicle position data 180(2) and the sensor data 180(3), the data distributor 190 broadcasts messages about the availability of new data when such new data becomes available.

Each message 191 identifies the availability of new data by an ID (or pointer). For example, with respect to the electronic horizon data 180(1), the message 191 sent by the data distributor 190 to the driver assistance applications 200 that use the data includes the ID associated with the electronic horizon data 180(1) in the data repository 180. Each message 191 may also indicate the type of new data which is available, e.g., electronic horizon, vehicle position, or sensor.

(The data distributor 190 also includes a registration component 190(2). The registration component 190(2) is used in conjunction with corresponding registration components 302 in the listeners 300, as explained in more detail below.)

H. The data listener 300

In the embodiment shown in FIG. 1, each of the driver assistance applications 200 that use the data collected by the data horizon program 110 uses a data listener 300. A data listener 300 is a set of functions that is associated with an driver assistance application 200 that uses the data collected by the data horizon program 110. A data listener 300 provides a means by which a driver assistance application 200 interfaces with the data horizon program 110. The data listener 300 includes processes by which each driver assistance application 200 that uses data stored by the data horizon program 110 can obtain the data it requires.

Figure 14:
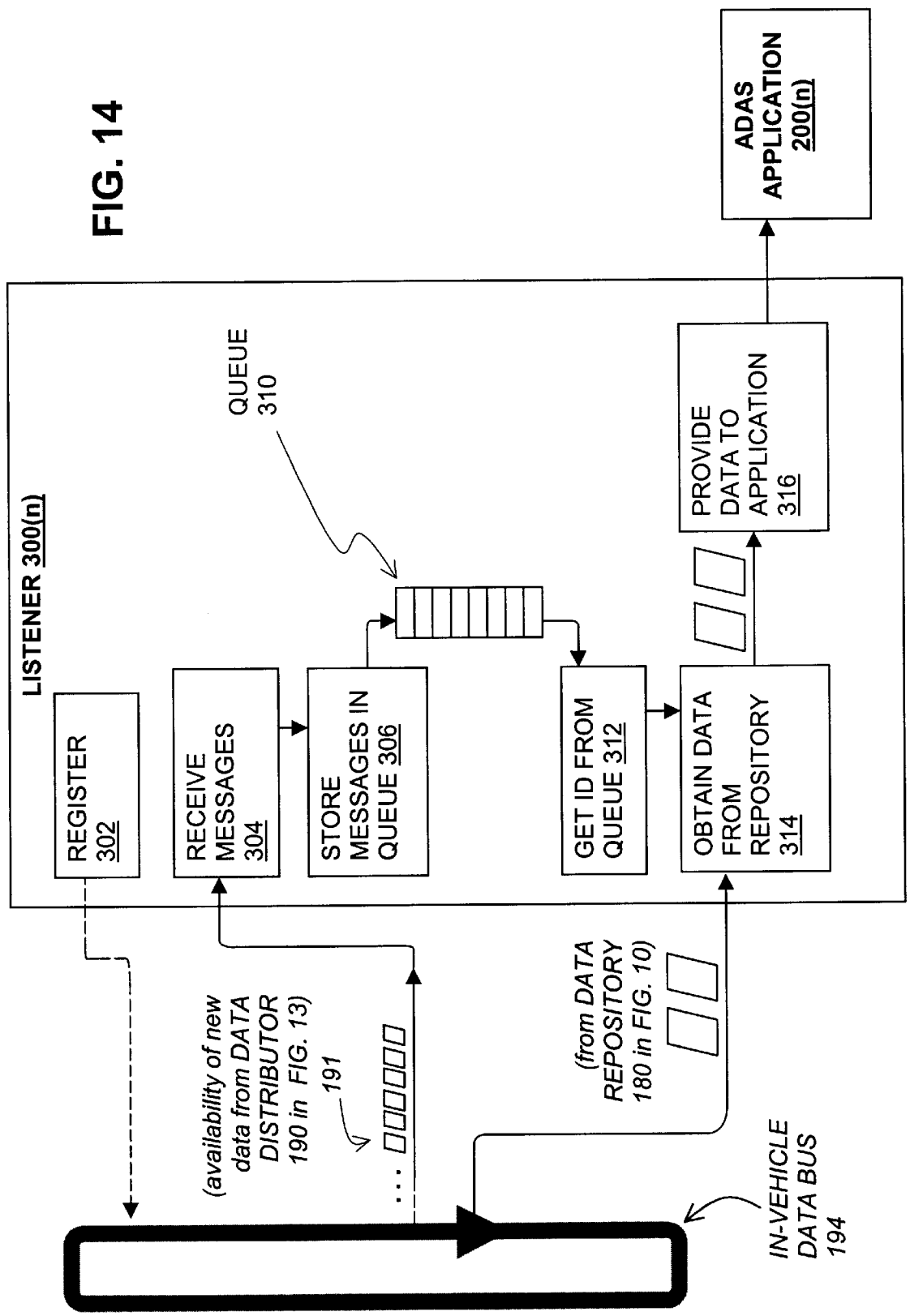
FIG. 14 is a block diagram showing components of the data listener in FIG. 1.

FIG. 14 shows components of a data listener 300(n). The data listener 300(n) is shown associated with a driver's assistance application 200(n). As shown in FIG. 14, the data listener 300(n) includes a registration component 302. The registration component 302 registers the particular listener 300(n) with the data horizon program 110. Specifically, the registration component 302 registers with the registration component 190(2) of the data distributor 190. As part of the registration process, the registration component 302 transmits a message to the data distributor 190 indicating that the listener (of which the component 302 is a part) is to be notified about the availability of new data. As part of the registration process, the registration component 302 also identifies to the registration component 190(2) of the data distributor 190 the type of data that about which the listener 300(n) is to be notified (e.g., electronic horizon data, vehicle position data, or sensor data.) In the embodiment of FIG. 14, the listener 300(n) is used for notification of electronic horizon data. Once the listener 300(n) is registered with the data distributor 190, the listener 300(n) will continue to be sent notifications from the data distributor 190 about the availability of new data of the type specified during registration as the new data is deposited in the data repository 180. The registration process may be performed once, e.g., when the driver assistance application 200 is initialized. The registration process may be performed subsequent times.

As stated above, after the listener 300(n) is registered with the data distributor 190, the listener 300(n) is regularly sent notifications 191 about the availability of new data. The data listener 300(n) includes a component 304 that receives these notifications 191. As mentioned above, each notification 191 includes an identification (i.e., ID) of a set of new data stored in the data repository 180. The data listener 300(n) includes a component 306 that stores each identification in a queue 310. The queue 310 is included as part of the data listener 300(n). The identifications stored in the queue 310 include at least those from the latest notifications received from the data distributor 190. The queue 310 may include identifications from several of the most recent notifications received from the data distributor 190. The size of the queue is configurable.

When the application 200(n) is ready to receive new data, the data listener 300(n) obtains the new data for the application 200(n). The data listener 300(n) includes a component 312 that obtains an identification from the queue 310. The component 312 may obtain the most recent identification added to the queue 310 or alternatively, the component 312 may obtain any other identification the queue 310. Upon obtaining an identification from the queue 310, a process 314 in the data listener 300(n) uses the identification to obtain the associated data from the data repository 180. Upon receiving the data from the data repository 190, a process 316 in the data listener 300(n) provides the data to the driver assistance application 200(n).

A driver assistance application 200 may use more than one of the different types of data stored in the data repository 180. If a driver assistance application uses more than one of the different types of data stored in the data repository 180, the driver assistance application is associated with more than one data listener. According to one embodiment, a separate data listener 300 is used by a driver assistance application for each of the different types of data that the driver assistance application uses. For example, if a driver assistance application 200 uses both electronic horizon data and sensor data, the driver assistance application 200 is associated with two separate data listeners 300—one for the electronic horizon data and the other for the sensor data.

Figure 15:
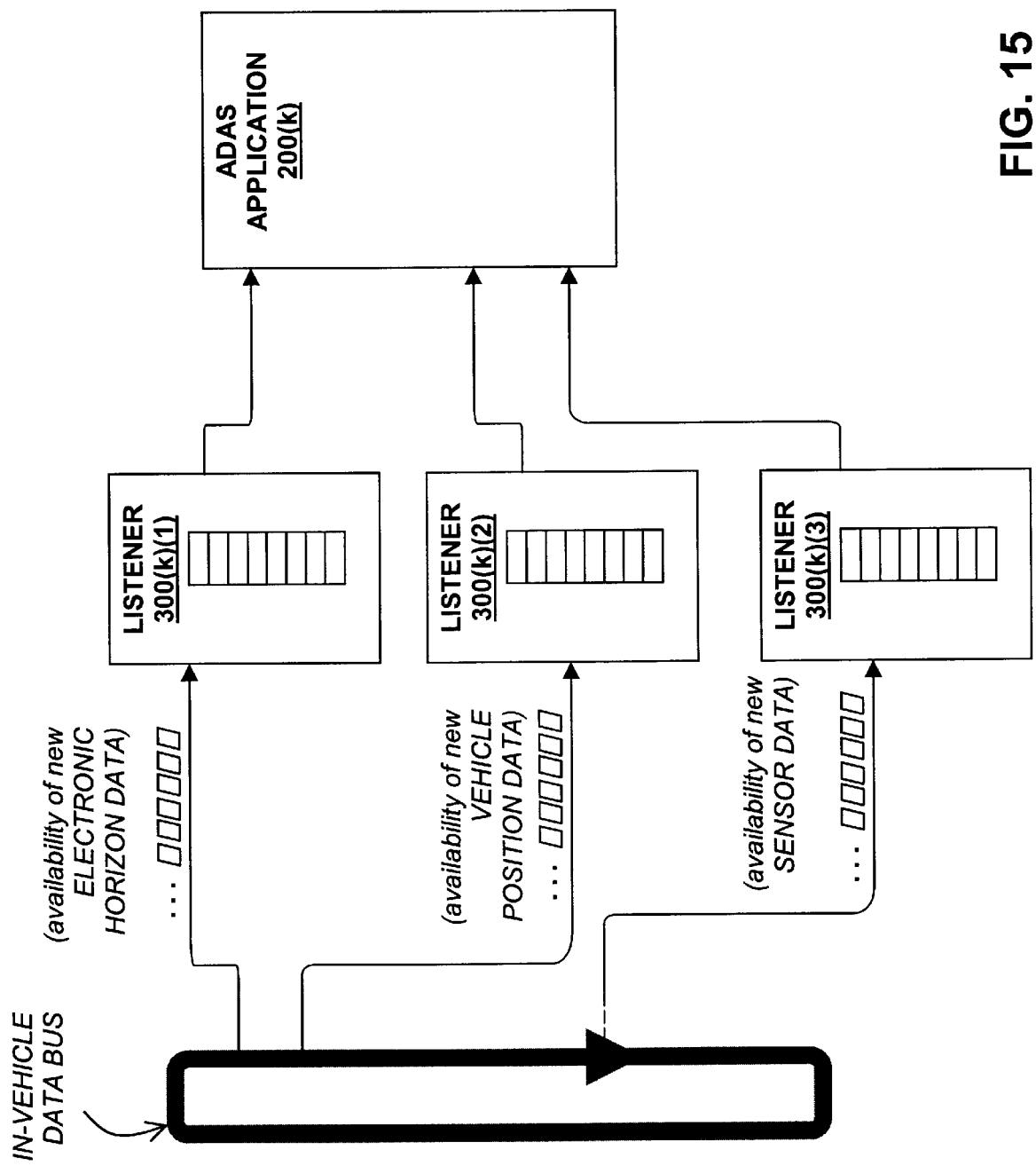
FIG. 15 is a block diagram showing an embodiment of a driver assistance application associated with plural listeners.

Each of the data listeners associated with a single driver assistance application receives messages from the data distributor 190 of the data horizon program 110 about the availability of new data of the type associated with the listener. Each of the data listeners maintains a separate queue of ID's by which the respective types of data can be obtained from the data repository 180. FIG. 15 shows an embodiment of a driver assistance application 200(k) associated with three separate listeners 300(k)(1), 300(k)(2), and 300(k)(3), for obtaining three different kinds of data.

I. Alternative embodiment for listener

In an embodiment described above, a data listener 300 was disclosed as a separate object from the driver assistance application 200 associated therewith that uses the data for which the listener was receiving notifications. According to an alternative embodiment, the listener function can be incorporated into the same object that processes the data for which the listener receives notifications. According to this alternative, an object (or application) that receives notifications about new data (from the data distributor) also directly processes the data. An application that both receives notifications about data and processes the data about which it receives notifications can implement these two functions as separate threads.

As described above in connection with the embodiment in which the listener process is implemented as a separate application or object, the event notification mechanism used in the listener requires that a notification call by the data horizon program return quickly. A notification call should consume minimal processing time and only signal the availabilty of data or start a thread that will get the data. In an embodiment in which the listener function is implemented as a separate thread in the same application or object that also implements the processing of the data, the event notification mechanism should also return quickly. In addition, in an embodiment in which the listener function is implemented as a separate thread in the same application or object that also processes the data, a means is used to start or stop the thread that performs the listener function. This can be performed by the data horizon program. Specifically, the data engine 170 can invoke the thread that listens for the event notification within the application or object that uses the data. A process in an application that uses the data can be registered with the data engine 170 in a similar fashion as described above in connection with a listener. Once the listener thread has been registered, the data engine starts (or stops, suspends or resumes) this thread whenever the data engine is started (stopped, suspended or resumed).

J. The monitoring program 160

Referring again to FIG. 1, the monitoring program 160 is a part of the data architecture 100. The monitoring program 160 allows for viewing the execution of the functions of the data horizon program 110. Some of the features of the monitoring program 160 may be used in a testing and configuration environment. Other features of the monitoring program 160 may be used during ordinary use by an end user of the motor vehicle 108 in which the map data architecture 100 is installed. In one alternative, the monitoring program 160 is used only in a testing and configuration environment and not in a run time environment (e.g., during ordinary operation of the vehicle by an end user) .

In a testing and configuration environment, an output of the monitoring program 160 may be provided to a display monitor 160(1) on which various aspects of the execution of the functions of the data horizon program 110 can be viewed. For example, the monitoring program 160 may present a continuous image of the position of the moving vehicle on a map on the display monitor 160(1). The display monitor 160(1) may also show an area around the current location of the vehicle. Those road segments that are parts of paths in the electronic horizon may be highlighted on the display monitor 160(1). In addition, the monitoring program 160 may show the current vehicle position, including a spot, heading, and speed on a map image on the display 160(1). If the vehicle 108 is following a route calculated by the route calculation tool (150(2)(3) in FIG. 4), the calculated route may be highlighted on the map image on the display 160(1). In addition, the monitoring program 160 may display the attributes of the road segments and intersections around the vehicle. These attributes include the attributes shown in FIGS. 3A and 3B. Attributes associated with the electronic horizon may also displayed. The monitoring program 160 adjusts the boundaries of the image of the map on the display monitor based on the current vehicle movement.

K. The configuration program 165

Referring again to FIG. 1, the configuration controller program 165 is a part of the data architecture 100. The configuration controller program 165 allows for configuring of the functions of the data horizon program 110. The configuration controller program 165 provides for setting the parameters, defaults, etc., that control the operation of data architecture 100, including the data horizon program 110. For example the configuration program 165 provides for determining the size of the electronic horizon in front of the vehicle for which data readings will be determined.

The configuration program 165 may provide for setting parameters during installation (or manufacture) of the driver assistance system equipment in the vehicle. The configuration program 165 may also provide for setting parameters when new equipment is installed, e.g., new sensors, new hardware, more memory. The configuration program 165 may also provide for setting new parameters when new data is installed, e.g., when the database 130 is updated.

The configuration program 165 may also be used at initialization or during operation of the vehicle in order to change the operating characteristics of the data horizon program 110. The configuration program 165 may receive inputs automatically from the driver assistance applications 200. The driver assistance applications 200 provide outputs indicating the types of data that they need. The driver assistance applications 200 may also provide outputs indicating the extents needed for the electronic horizon. The extent of the electronic horizon may be specified in distance (e.g., meters) or time (e.g., segments onto which the vehicle can travel within the next 10 seconds).

The configuration program 165 can be used to register a data listener 300 to receive a continuous broadcast of the latest data values from the data distributor 190.

The configuration program 165 can also be used to interface the data listener 300 to an in-vehicle data bus architecture for transfer of data readings to the vehicle's advanced driver assistance applications 200 running on the bus.

L. Using the advanced driver assistance system map data architecture (1) Overview Advanced driver assistance systems provide ways to improve the safety, comfort, efficiency, and overall satisfaction of driving. These systems require information about the road network around the vehicle. Some of this information can be obtained by sensors. However, sensors do not reliably obtain all the types of information needed by some of these systems. Accordingly, use of a map database in addition to, or as a substitute for, sensors can make advanced driver assistance systems operate better and more reliably.

Embodiments of the disclosed advanced driver assistance systems map data architecture (100 in FIG. 1) provide a means by which one or more advanced driver assistance system applications 200 can use map data in support of the function(s) provided thereby. The advanced driver assistance systems map data architecture provides advanced driver assistance system applications with access to data about road geometry and other attributes within the vicinity of the vehicle. For example, the advanced driver assistance systems map data architecture provides access to data representing any location along the road network near the vehicle that can be reached within 10 seconds of driving time. This portion of the road network corresponds to the electronic horizon. The electronic horizon is re-calculated regularly over time and/or as the vehicle moves along the road network. Once an electronic horizon has been calculated, the advanced driver assistance system application can use the data about the vehicle paths in the electronic horizon.

Figure 16:
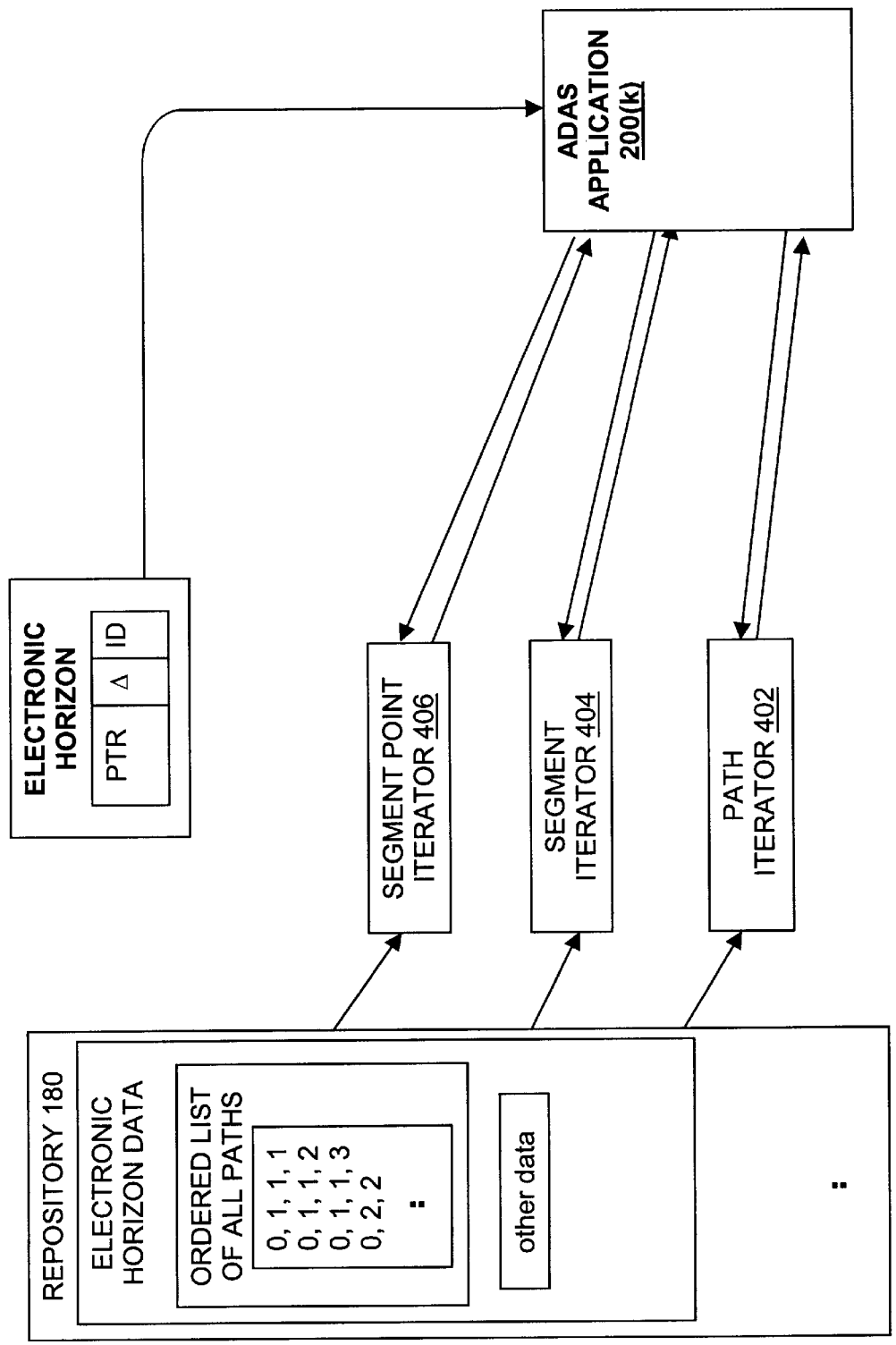
FIG. 16 is a block diagram showing how a driver assistance application uses various functions to obtain electronic horizon data.

Referring to FIG. 16, an advanced driver assistance application 200 can access the data represented by an electronic horizon with an electronic horizon handle (i.e., the ID of the electronic horizon object 182 in the data repository 180 in FIG. 11). The advanced driver assistance application 200 relies on the listener (300 in FIG. 14) to obtain the ID of the latest electronic horizon (182 in FIG. 11) from the data distributor 190. With the ID of the electronic horizon object 182, any or all of the data in the electronic horizon data object (181 in FIG. 11) can be obtained. The electronic horizon data object 181 identifies all the possible vehicle paths (or the primary path) out to the extent of the electronic horizon. The electronic horizon data object 181 also identifies the segments and nodes in each path (i.e., using the segment descriptors and node descriptors, described above).

According to a present embodiment, advanced driver assistance applications may also obtain sensor data and vehicle position data.

(2) Iterators

With respect to data contained in an electronic horizon, a driver assistance application 200 can use one of the iterators to obtain the data contained in an electronic horizon in an organized manner. An iterator is a programming construct that allows the successive retrieval of items from a collection of items. The iterators allow an advanced driver assistance application to traverse the electronic horizon for retrieval of path descriptors, electronic horizon segments, data about points along segments, etc. Included among the iterators that are available for use by the driver assistance applications are a path iterator 402, a segment iterator 404 and a segment point iterator 406. To use any of the iterators, the advanced driver assistance applications initialize the iterator with the appropriate electronic horizon ID and/or other appropriate information.

(a) Path iterator

The path iterator 402 is an iterator that generates all paths of an electronic horizon, one path at a time. The path iterators allows the generation of all paths or only of those paths which are accessible.

(b) Segment iterator

The segment iterator 404 returns a list of electronic horizon segments. Given a node, the segment iterator 404 first returns the entrance segment of that node (in the context of a path in the electronic horizon) and then all exit segments of the node (in clockwise orientation).

(c) Segment point iterator

The segment point iterator 406 is an iterator that returns segment points. A segment point iterator 406 can be initialized with a segment of an electronic horizon or with a path of an electronic horizon. When initialized with a segment of an electronic horizon, the segment point iterator 406 returns all points of the segment starting with the entrance node of the segment. When initialized with a path of an electronic horizon, the segment point iterator 406 returns the first point after the current vehicle position and then all the points along all the segments that form the path in the order in which they occur in the path. Note that for an intermediate node of a path, the segment point iterator 406 returns first the exit node of the incoming segment and then the entrance node of the outgoing segment.

(3) Determining the accuracy of data

In some of the embodiments of the map database (130 in FIGS. 1, 3A and 3B) some roads are represented by higher accuracy data than other roads. Some advanced driver assistance systems 200 may require that the vehicle be located on a road represented by the higher accuracy data. Alternatively, some advanced driver assistance systems 200 may require that all the roads located around the vehicle (e.g., in the electronic horizon) be represented by the higher accuracy data. Thus, the architecture 100 provides a means by which the driver assistance applications 200 can determine whether the vehicle is located on a road represented by higher accuracy data or whether all the road segments located within the electronic horizon are represented by higher accuracy data. If the higher accuracy data is located in a supplementary database, such as the database 130(2) in FIG. 1, the determination whether the data is higher accuracy data can be made identifying the source of the data (e.g., the supplementary database 130(2) or the primary database 130(1)). In a single database embodiment having both higher accuracy data and lower accuracy data, the determination whether the data is higher accuracy can be made by reference to an appropriate data attribute (such as the accuracy level attribute, described above). In some embodiments, the data horizon program 110 can be configured not to provide an electronic horizon unless all road segments in all the paths of the electronic horizon are represented by higher accuracy data.

M. Implementation

The advanced driver assistance systems data interface architecture includes software and hardware components that run on a suitable computing platform. In a prototype system, the advanced driver assistance systems data interface architecture runs in a Microsoft Windows or Microsoft NT environment including a networked personal computer (Pentium II or higher). Alternative platforms are also suitable.

In a prototype environment, data is passed from the sensors 120 to the connected personal computer via a serial connection (RS-232).

III. ALTERNATIVE EMBODIMENTS

A. In-vehicle bus architecture alternative

Figure 17:
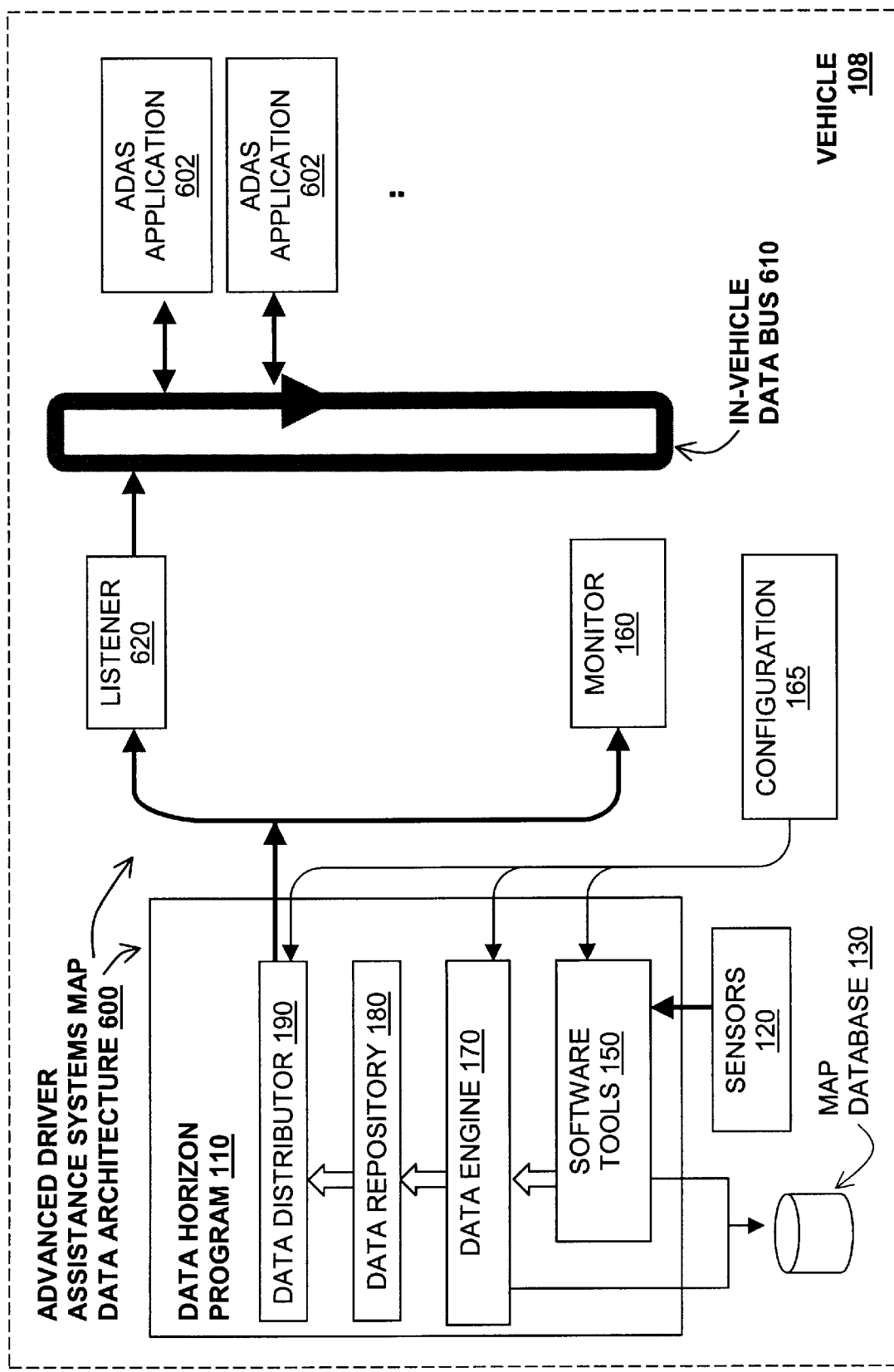
FIG. 17 is a block diagram showing an alternative embodiment of the driver assistance systems map data architecture.

An alternative embodiment of the driver assistance systems map data architecture 600 is shown in FIG. 17. According to this alternative, driver assistance applications 602 run on dedicated micro-controllers connected to an in-vehicle data bus 610. In this embodiment, the in-vehicle data bus 610 is a CAN bus although in alternative embodiment, the in-vehicle bus can be any other kind of bus. In the embodiment of FIG. 17, a data listener 620 (which may be similar or identical to the data listeners 300, described above) is adapted to interface to the in-vehicle data bus 610 and communicate data readings using the standard methods and protocols for that bus.

B. Electronic horizon combined with sensor data

In the embodiment of the data horizon program described above, an electronic horizon data object was formed that included data representing the paths that the vehicle can follow out to the extents of the electronic horizon. The data representing the paths included data representing road attributes, road geometry, and road objects. In the embodiment described above, the data representing the paths was either obtained from the map database 130 or derived from data in the map database (e.g., curvature). According to an alternative embodiment, the electronic horizon data also includes dynamic data. Dynamic data includes data from the sensors, derived from the sensor data, or derived from a combination of sensor data and data from the map database. According to this embodiment, sensor data can be associated with one or more of the paths in the electronic horizon. As an example, if a radar system sensor in the vehicle detects an object located 100 meters ahead of the vehicle, data indicating this detected object is included in the electronic horizon. If an electronic horizon path corresponds to the location of the detected object, data indicating the detected object may be associated with the path at the corresponding location (e.g., at a point of the segment in the path).

According to another aspect, if a feature represented by data in the map database should be detectable by one or more sensors in the vehicle, a routine in the data horizon program attempts to match the represented feature to an object detected by the sensors. For example, assume the electronic horizon includes data from the map database indicating the presence of an overpass located 80 meters ahead of the vehicle and further assume that a radar system sensor in the vehicle detects an object located 82 meters ahead of the vehicle extending across the road. According to this alternative, a routine in the data horizon program relates the data from the map database indicating the presence of the overpass and the data from the radar sensor indicating the presence of an object extending across the road. According to a further aspect of this alternative, a routine in the data horizon program may indicate a difference (e.g. a Δ) between the location of the overpass as indicated by the data from the map database and the location of the object extending across the road as indicated by radar sensor.

C. Other alternatives

In the embodiment of the data repository described above, a handle-container mechanism was described that facilitated storage and use of the electronic horizon data. In alternative embodiments, each set of data that represents a separate electronic horizon may be retained as a full set of data (i.e., all the attributes for each path).

As mentioned above, the data engine 170 (in FIG. 5) may be configured to determined a primary path. If a primary path has been determined by the data engine 170, the electronic horizon data (180(1) in FIG. 10) contained in the data repository 180 may include only the primary path data. Alternatively, the data repository 180 may also contain both the primary path data as well as data representing the entire electronic horizon data.

As mentioned above, in one embodiment, a separate data listener is used by a driver assistance application for each of the different types of data that the driver assistance application uses. According to an alternative embodiment, a single data listener may be used for more than one type of data. According to this alternative, a single data listener receives notifications about more than one type of data and responds with requests for more than one type of data. For example, according to this alternative embodiment, if a driver assistance application uses both electronic horizon data and sensor data, a single data listener can be associated with the driver assistance application and be used to receive notifications about both the electronic horizon data and the sensor data.

In an embodiment described above, a listener receives a notification about the availability of new data in the data repository and then requests the new data be sent to it. According to an alternative embodiment, when a listener receives a notification about the availability of new data, it can request that the new data be sent by broadcast, multicast, or other means, to several applications and/or listeners.

According to a further alternative embodiment, a data listener registers with the data distributor and thereafter automatically receives the data in the electronic horizon when it becomes available. According to this alternative, the data listener does not first receive a notification of the availability of new data and request the new data upon receipt of the notification. According to this alternative embodiment, the data listener can receive the new data by point-to-point transmission, broadcast, multicast, or other means.

IV. ADVANTAGES

The embodiments of the advanced driver assistance system map data architecture (in FIGS. 1 and 17) provide a means by which one or more advanced driver assistance systems can utilize map data to support the function(s) provided thereby. Use of map data by advanced driver assistance systems can enhance the functions provided by such systems. The architecture disclosed herein affords a means by which more than one driver assistance application can use the same map data. The architecture disclosed herein also affords a means by which different driver assistance applications can obtain different kinds of map data. In addition, the architecture disclosed herein also affords a means by which different driver assistance applications can obtain map data at different rates.

Embodiments of the map data architecture disclosed herein provide additional advantages. Driver assistance application software is maintained separate from the data horizon program, thereby providing versatility, compatibility, and reliability. Moreover, because the data horizon program implements an easy to use interface, it is relatively easy for different kinds of driver assistance applications to use the data horizon program.

It is intended that the foregoing detailed description be regarded as illustrative rather than limiting and that it is understood that the following claims including all equivalents are intended to define the scope of the invention.

We claim:

1. A method of providing data about roads around a motor vehicle comprising the steps of:

accessing data that represent segments of roads of a road network located in a geographic region;

determining paths along roads onto which the motor vehicle can travel from a current position of the motor vehicle within a first threshold; and providing data representing the paths;

wherein said first threshold is a function of a distance that the motor vehicle can travel at a current speed of the motor vehicle.

2. A method of providing data about roads around a motor vehicle comprising the steps of:

accessing data that represent segments of roads of a road network located in a geographic region;

determining paths along roads onto which the motor vehicle can travel from a current position of the motor vehicle within a first thresbold; and providing data representing the paths;

wherein said first threshold is a further of speed limits of the segments of roads around the motor vehicle.

3. A method of providing data about roads around a motor vehicle comprising the steps of;

accessing data that represent segments of roads of a road network located in a geographic region;

determining paths along roads onto which the motor vehicle can travel from a current position of the motor vehicle within a first threshold; and providing data representing the paths;

wherein said first threshold is a function of delays associated with traversing intersections between segments of roads.

4. A method of providing data about roads around a motor vehicle comprising the steps of:

accessing data that represent segments of roads of a road network located in a geographic region;

determining paths along roads onto which the motor vehicle can travel from a current position of the motor vehicle within a first threshold; and providing data representing the paths;

wherein said first threshold is a function of a distance that the motor vehicle can travel within a given amount of time.

5. A method of providing data about roads around a motor vehicle comprising the steps of:

accessing data that represent segments of roads of a road network located in a geographic region;

determining paths along roads onto which the motor vehicle can travel from a current position of the motor vehicle within a first threshold; and providing data representing the paths;

wherein said first threshold is a function of a distance that the motor vehicle can travel within a given amount of time at a current speed of the motor vehicle.

6. A method of providing data about roads around a motor vehicle comprising the steps of:

accessing data that represent segments of roads of a road network located in a geographic region;

determining paths along roads onto which the motor vehicle can travel from a current position of the motor vehicle within a first threshold; and providing data representing the paths;

wherein said first threshold includes a minimum distance and an additional distance which is a flimction of one of a vehicle speed, speed limits of the segments of roads around the motor vehicle, delays associated with traversing intersections, and a distance that the motor vehicle can travel within a given amount of time at a current speed of the motor vehicle.

7. A method of providing data about roads around a motor vehicle comprising the steps of:

accessing data that represent segments of roads of a road network located in a geographic region;

determining paths along roads onto which the motor vehicle can travel from a current position of the motor vehicle within a first threshold; and providing data representing the paths;

wherein said data representing the paths is provided in a data structure and wherein said data structure is a tree structure.

8. A method of providing data about roads around a motor vehicle comprising the steps of:

accessing data that represent segments of roads of a road network located in a geographic region;

determining paths along roads onto which the motor vehicle can travel from a current position of the motor vehicle within a first threshold; and providing data representing the paths;

wherein said paths include all paths along which the motor vehicle can travel from said current position while complying with legal restrictions on vehicular travel along road segments that form said paths.

9. A method of providing data about roads around a motor vehicle comprising the steps of:

accessing data that represent segments of roads of a road network located in a geographic region;

determining paths along roads onto which the motor vehicle can travel from a current position of the motor Vehicle within a firs threshold; and providing data representing the paths;

wherein said paths include all paths along which the motor vehicle can travel from said current position while complying with legal restrictions on vehicular travel as well as paths along which the motor vehicle can physically travel while not complying with legal restrictions on vehicular travel.

10. A method of providing data about roads around a motor vehicle comprising the steps of:

accessing data that represent segments of roads of a road network located in a geographic region;

determining paths along roads onto which the motor vehicle can travel from a current position of the motor vehicle within a first threshold, wherein each of said paths is comprised of road segments;

providing data representing the paths; and providing data that represents said road segments that form said paths;

wherein each of said paths is comprised of whole road segments except for a road segment upon which the motor vehicle is currently located.

11. The method of claim 10 wherein said data representing the paths is provided in a data structure.

12. A method of providing data about roads around a motor vehicle comprising the steps of:

accessing data that represent segments of roads of a road network located in a geographic region;

determining paths along roads onto which the motor vehicle can travel from a current position of the motor vehicle within a first threshold;

providing data representing the paths; and providing data that associates road segments onto which the motor vehicle can travel from said current position with said data representing said paths.

13. The method of claim 12 wherein said paths are ordered from a first path to a last path.

14. The method of claim 12 wherein said paths are ordered according to a turn direction at each intersection between road segments included in each path.

15. A method of providing data about roads around a motor vehicle comprising the steps of:

accessing data that represent segments of roads of a road network located in a geographic region;

determining paths along roads onto which the motor vehicle can travel from a current position of the motor vehicle within a first threshold; and providing data representing the paths;
wherein data representing road segments that form said paths are contained in a database located on-board the motor vehicle.

16. A method of providing data about roads around a motor vehicle comprising the steps of:
accessing data that represent segments of roads of a road network located in a geographic region;
determining paths along roads onto which the motor vehicle can travel from a current position of the motor vehicle within a first threshold; and
providing data representing the paths,
wherein said step of determining is performed each time a new vehicle position is determined.

17. A method of providing data about roads around a motor vehicle comprising the steps of:
accessing data that represent segments of roads of a road network located in a geographic region;
determining paths along roads onto which the motor vehicle can travel from a current position of the motor vehicle within a first threshold;
providing data representing the paths; and
when providing data representing the paths, also providing data representing the current position of the motor vehicle relative to said paths.

18. The method of claim 17 further comprising the step of
after performing the step of providing data representing the paths and data representing the current position of the motor vehicle relative to said paths, determining a new current vehicle position;
determining whether a cost of travel along any of said paths from said new current vehicle position is less than a second threshold; and
if said cost of travel along each of said paths from said new current vehicle position exceeds the second threshold, providing data representing the paths and data representing the new current position of the motor vehicle relative to said paths.

19. The method of claim 17 further comprising the step of
after performing the step of providing data representing the paths and data representing the current position of the motor vehicle relative to said paths, receiving a new current vehicle position;
determining whether a cost of travel along any of said paths from said new current vehicle position is less than a second threshold;
if said cost of travel along any of said paths from said new current vehicle position is less than said second threshold, determining new paths along roads onto which the motor vehicle can travel from said new current position of the motor vehicle wherein said new paths are within said first threshold; and
providing data representing the new paths and data representing the new current position of the motor vehicle relative to said new paths.

20. The method of claim 8 further comprising the steps of;
determining a primary path wherein said primary path comprises one of said paths; and
providing data indicating said primary path.

21. A method of providing data about roads around a motor vehicle comprising the steps of:
accessing data that represent segments of roads of a road network located in a geographic region;
determining paths along roads onto which the motor vehicle can travel from a current position of the motor vehicle within a first threshold;
providing data representing the paths;
determining a primary path wherein said primary path comprises one of said paths; and
providing data indicating said primary path;
wherein said primary path corresponds to a previously calculated route.

22. A method of providing data about roads around a motor vehicle comprising the steps of:
accessing data that represent segments of roads of a road network located in a geographic region;
determining paths along roads onto which the motor vehicle can travel from a current position of the motor vehicle within a first threshold;
providing data representing the paths;
determining a primary path wherein said primary path comprises one of said paths; and
providing data indicating said primary path;
wherein said primary path corresponds to a path that said motor vehicle is most likely to follow.

23. A method of providing data about roads around a motor vehicle comprising the steps of:
accessing data that represent segments of roads of a road network located in a geographic region;
determining paths along roads onto which the motor vehicle can travel from a current position of the motor vehicle within a first threshold; and
providing data representing the paths;
wherein said paths include U-turns.

24. The method of claim 26 wherein said paths include all paths along which the motor vehicle can travel from said current position.

25. A method of providing data about roads around a motor vehicle comprising the steps of:
accessing data that represent segments of roads of a road network located in a geographic region;
determining paths along roads onto which the motor vehicle can travel from a current position of the motor vehicle within a first threshold;
providing data representing the paths; and
providing sensor data along with the data representing the paths.

26. The method of claim 25 wherein said sensor data are related to the data representing said paths.

27. A software program installed in a motor vehicle that provides data about a road network around the motor vehicle comprising:
a programming routine that accesses data that represent roads located around a current vehicle position;
a programming routine that determines which roads located around the current vehicle position are paths along which the motor vehicle can travel from said current position out to an extent associated with a threshold; and
a programming routine that stores data defining said paths in a temporary data repository from which other applications can obtain said data defining said paths.

28. A method performed by a software program installed in a motor vehicle to provide data about a road network around a motor vehicle comprising the steps of:
determining a plurality of paths that the motor vehicle can travel from a current location out to an extent associated with a threshold;
wherein each path is comprised of a different sequence of one or more road segments;

and wherein each sequence begins with the road segment upon which the motor vehicle is located;

and wherein the roads segments in each sequence form a continuous path along which the motor vehicle can travel from the current location out to said extent; and providing data defining the sequence of road segments in each of said plurality of paths for use by other applications in said motor vehicle.

29. The invention of claim 28 comprising:

providing data indicating the curvature at points along said paths.

30. The invention of claim 28 comprising:

providing data indicating road objects along said paths, wherein said road objects include signs and crosswalks.

31. The method of claim 28 wherein said threshold is a function of a distance that the motor vehicle can travel at a current speed of the motor vehicle.

32. The method of claim 28 wherein said threshold is a function of speed limits of the road segments around the motor vehicle.

33. The method of claim 28 wherein said threshold is a function of delays associated with traversing intersections between road segments.

34. The method of claim 28 wherein said threshold is a function of a distance that the motor vehicle can travel within a given amount of time.

35. The method of claim 28 wherein said threshold is a function of a distance that the motor vehicle can travel within a given amount of time at a current speed of the motor vehicle.

36. The method of claim 28 wherein said threshold includes a minimum distance and an additional distance which is a function of one of a vehicle speed, speed limits of the road segments around the motor vehicle, delays associated with traversing intersections, and a distance that the motor vehicle can travel within a given amount of time at a current speed of the motor vehicle.

37. The method of claim 28 wherein said data defining the sequence of road segments in each of said plurality of paths is provided in a data structure.

38. The method of claim 37 wherein said data structure is a tree structure.

39. The method of claim 28 wherein said paths include all paths along which the motor vehicle can travel from said current location.

40. The method of claim 28 wherein said paths include all paths along which the motor vehicle can travel from said current location while complying with legal restrictions on vehicular travel along road segments that form said paths.

41. The method of claim 28 wherein said paths include all paths along which the motor vehicle can travel from said current location while complying with legal restrictions on vehicular travel as well as paths along which the motor vehicle can physically travel while not complying with legal restrictions on vehicular travel.

42. The method of claim 28 wherein each of said paths is comprised of whole road segments except for a road segment upon which the motor vehicle is currently located.

43. The method of claim 28 further comprising:

providing data that associates road segments onto which the motor vehicle can 3 travel from said current location with said data defining the sequence of road segments in each of said plurality of paths.

44. The method of claim 28 wherein said paths are ordered from a first path to a last path.

45. The method of claim 28 wherein said paths are ordered according to a turn direction at each intersection between road segments included in each path.

46. The method of claim 28 wherein data representing road segments that form said paths are contained from a database located on-board the motor vehicle.

47. The method of claim 28 wherein said step of determining is performed each time a new vehicle location is determined.

48. The method of claim 28 further comprising:

when providing said data defining the sequence of road segments in each of said plurality of paths, also providing data representing the current location of the motor vehicle relative to said paths.

49. The method of claim 48 further comprising the step of:

after performing the step of providing said data defining the sequence of road segments in each of said plurality of paths and said data representing the current position of the motor vehicle relative to said paths, determining a new current vehicle location;

determining whether a cost of travel along any of said paths from said new current vehicle location is less than a second threshold; and if said cost of travel along each of said paths from said new current vehicle location exceeds the second threshold, providing said data defining the sequence of road segments in each of said plurality of paths and said data representing the new current location of the motor vehicle relative to said paths.

50. The method of claim 48 further comprising the step of:

after performing the step of providing said data defining the sequence of road segments in each of said plurality of paths and said data representing the current location of the motor vehicle relative to said paths, determining a new current vehicle location;

determining whether a cost of travel along any of said paths from said new current vehicle location is less than a second threshold;

if said cost of travel along any of said paths from said new current vehicle location is less than said second threshold, determining new paths along roads onto which the motor vehicle can travel from said new current location of the motor vehicle wherein said new paths are within said threshold; and providing data defining the sequence of road segments in each of said plurality of new paths and data representing the new current location of the motor vehicle relative to said new paths.

51. The method of claim 28 further comprising the step of:

determining a primary path wherein said primary path comprises one of said plurality of paths; and providing data indicating said primary path.

52. The method of claim 51 wherein said primary path corresponds to a previously calculated route.

53. The method of claim 51 wherein said primary path corresponds to a path that said motor vehicle is most likely to follow.

54. The method of claim 28 wherein said paths include a U-turn.

55. The method of claim 28 further comprising the step of:

providing sensor data along with the data representing the paths.

56. The method of claim 55 wherein said sensor data are related to the data defining the sequence of road segments in each of said plurality of paths.

57. The program of claim 27 wherein said threshold is a function of a distance that the motor vehicle can travel at a current speed of the motor vehicle.

58. The software program of claim 27 wherein said threshold is a function of speed limits of roads around the motor vehicle.

59. The software program of claim 27 wherein said threshold is a function of delays associated with traversing intersections between segments of roads.

60. The software program of claim 27 wherein said threshold is a function of a distance that the motor vehicle can travel within a given amount of time.

61. The software program of claim 27 wherein said threshold is a function of a distance that the motor vehicle can travel within a given amount of time at a current speed of the motor vehicle.

62. The software program of claim 27 wherein said threshold includes a minimum distance and an additional distance which is a function of one of a vehicle speed, speed limits of roads around the motor vehicle, delays associated with traversing intersections, and a distance that the motor vehicle can travel within a given amount of time at a current speed of the motor vehicle.

63. The software program of claim 27 wherein said data defining the paths is stored in a data structure.

64. The method of claim 63 wherein said data structure is a tree structure.

65. The software program of claim 27 wherein said paths include all paths along which the motor vehicle can travel from said current position.

66. The software program of claim 27 wherein said paths include all paths along which the motor vehicle can travel from said current position while complying with legal restrictions on vehicular travel along road segments that form said paths.

67. The software program of claim 27 wherein said paths include all paths along which the motor vehicle can travel from said current position while complying with legal restrictions on vehicular travel as well as paths along which the motor vehicle can physically travel while not complying with legal restrictions on vehicular travel.

68. The software program of claim 27 wherein each of said paths is comprised of whole road segments except for a road segment upon which the motor vehicle is currently located.

69. The software program of claim 27 wherein said programming routine that stores data defining said paths also stores data that associates road segments onto which the motor vehicle can travel from said current position with said data defining said paths.

70. The software program of claim 27 wherein said paths are ordered in said temporary data repository from a first path to a last path.

71. The software program of claim 27 wherein said paths are ordered in said temporary data repository according to a turn direction at each intersection between road segments included in each path.

72. The software program of claim 27 wherein said data that represent roads are contained in a database located on-board the motor vehicle.

73. The software program of claim 27 wherein said programming routine that determines which roads located around the current vehicle position are paths along which the motor vehicle can travel from said current position out to an extent associated with a threshold determines the roads each time a new vehicle position is determined.

74. The software program of claim 27 wherein said programming routine that stores data defining said paths also stores data representing the current position of the motor vehicle relative to said paths.

75. The software program of claim 27 further comprising:

a programming routine that determines a primary path wherein said primary path comprises one of said plurality of paths; and a programming routine that stores data indicating said primary path in said temporary data repository.

76. The software program of claim 75 wherein said primary path corresponds to a previously calculated route.

77. The software program of claim 75 wherein said primary path corresponds to a path that said motor vehicle is most likely to follow.

78. The software program of claim 27 wherein said paths include a U-turn.

79. The software program of claim 27 further comprising:

a programming routine that stores sensor data in said temporary data repository.

80. The software program of claim 79 wherein said sensor data are related to the data defining the paths.

* * * * *